United States Patent
Sleiman

(10) Patent No.: US 10,696,440 B2
(45) Date of Patent: Jun. 30, 2020

(54) LABELLER AND METHOD OF USING THE SAME

(71) Applicant: Sumier Sleiman, Tecumseh (CA)

(72) Inventor: Sumier Sleiman, Tecumseh (CA)

(73) Assignee: Labelpac Incorporated, Tecumseh, Ontario (CA)

(*) Notice: Subject to any disclaimer, the term of this patent is extended or adjusted under 35 U.S.C. 154(b) by 0 days.

(21) Appl. No.: 16/087,260

(22) PCT Filed: Mar. 24, 2017

(86) PCT No.: PCT/US2017/023976
§ 371 (c)(1),
(2) Date: Sep. 21, 2018

(87) PCT Pub. No.: WO2017/165737
PCT Pub. Date: Sep. 28, 2017

(65) Prior Publication Data
US 2019/0071205 A1 Mar. 7, 2019

Related U.S. Application Data

(60) Provisional application No. 62/312,601, filed on Mar. 24, 2016, provisional application No. 62/407,687, filed on Oct. 13, 2016.

(51) Int. Cl.
*B65C 9/18* (2006.01)
*B65G 47/244* (2006.01)
(Continued)

(52) U.S. Cl.
CPC ............ *B65C 9/1884* (2013.01); *B32B 37/14* (2013.01); *B65C 9/30* (2013.01); *B65G 47/244* (2013.01); *B65C 9/04* (2013.01)

(58) Field of Classification Search
CPC .. B65C 3/14; B65C 3/16; B65C 3/163; B65C 3/166; B65C 3/24; B65C 3/26;
(Continued)

(56) References Cited

U.S. PATENT DOCUMENTS

| | | |
|---|---|---|
| 3,924,381 A | 12/1975 | Sardo |
| 4,108,709 A | 8/1978 | Hoffmann |

(Continued)

FOREIGN PATENT DOCUMENTS

| | | |
|---|---|---|
| EP | 0113256 A2 | 7/1984 |
| EP | 1044884 A2 | 10/2000 |

(Continued)

OTHER PUBLICATIONS

International Preliminary Report on Patentability for PCT/US2017/023976 dated Oct. 4, 2018 (7 pages).

(Continued)

*Primary Examiner* — George R Koch
(74) *Attorney, Agent, or Firm* — Bejin Bieneman PLC

(57) ABSTRACT

A labelling method includes receiving an occupied signal from a conveyor indicating that the next spot on the conveyor is occupied with an object to be labeled and instructing a turret motor to rotate a turret continuously from one application position to another application position to apply a second label to the second object. The method then includes determining the absence of an occupied signal within a time threshold, and instructing the turret motor to rotate the turret to an intermediate position and to slow the turret at the intermediate position. The intermediate position is between two consecutive application positions. The method then includes receiving another occupied signal indicating that the next spot on the conveyor is occupied, and instructing the turret motor to rotate the turret to the next application position to apply a third label to the object.

20 Claims, 15 Drawing Sheets

(51) Int. Cl.
*B32B 37/14* (2006.01)
*B65C 9/30* (2006.01)
*B65C 9/04* (2006.01)

(58) Field of Classification Search
CPC .......... B65C 5/00; B65C 9/00; B65C 9/0006; B65C 9/02; B65C 9/04; B65C 9/06; B65C 9/08; B65C 9/10; B65C 9/12; B65C 2009/0059
See application file for complete search history.

(56) References Cited

U.S. PATENT DOCUMENTS

| | | | |
|---|---|---|---|
| 4,123,310 A | 10/1978 | Varon et al. | |
| 4,194,941 A | 3/1980 | Briggs et al. | |
| 4,214,937 A | 7/1980 | Geurtsen et al. | |
| 4,217,164 A | 8/1980 | La Mers | |
| 4,244,763 A | 1/1981 | Varon et al. | |
| 4,896,793 A | 1/1990 | Briggs et al. | |
| 5,024,717 A | 6/1991 | Winter | |
| 5,387,302 A | 2/1995 | Bernard et al. | |
| 5,478,422 A * | 12/1995 | Bright | B65C 3/16 156/351 |
| 5,645,680 A | 7/1997 | Rietheimer | |
| 5,660,676 A | 8/1997 | Brooks | |
| 5,738,755 A | 4/1998 | Hartman | |
| 5,788,284 A | 8/1998 | Hirst | |
| 5,829,351 A | 11/1998 | Anderson et al. | |
| 6,047,755 A | 4/2000 | Anderson | |
| 6,179,030 B1 | 1/2001 | Rietheimer | |
| 6,230,779 B1 | 5/2001 | Anderson et al. | |
| 6,230,780 B1 | 5/2001 | Rietheimer | |
| 6,240,766 B1 | 6/2001 | Cawley | |
| 6,257,294 B1 | 7/2001 | Weisbeck | |
| 6,408,916 B1 | 6/2002 | Anderson et al. | |
| 6,427,746 B1 | 8/2002 | Andreson et al. | |
| 6,435,002 B1 | 8/2002 | Briggs | |
| 6,668,896 B1 | 12/2003 | Granero Tormo | |
| 6,712,109 B2 | 3/2004 | Anderson | |
| 6,729,375 B2 | 5/2004 | Nielsen et al. | |
| 6,792,992 B2 | 9/2004 | Goetz | |
| 7,021,353 B2 | 4/2006 | Constantine et al. | |
| 7,153,378 B2 | 12/2006 | Sleiman et al. | |
| 7,168,472 B2 | 1/2007 | Hirst et al. | |
| 7,175,128 B2 | 2/2007 | Korthauer | |
| 7,178,574 B2 | 2/2007 | Nielsen | |
| 7,363,954 B2 | 4/2008 | Sleiman | |
| 7,368,028 B2 | 5/2008 | Spatafora | |
| 7,392,720 B2 | 7/2008 | Howarth et al. | |
| 7,712,509 B2 | 5/2010 | Constantine | |
| 7,837,823 B2 | 11/2010 | Griffin et al. | |
| 7,975,743 B2 | 7/2011 | Sleiman et al. | |
| 8,011,405 B2 | 9/2011 | Sleiman et al. | |
| 8,066,044 B2 | 11/2011 | Lichtenberg et al. | |
| 8,066,045 B2 | 11/2011 | Sleiman | |
| 8,110,064 B2 | 2/2012 | Arrington et al. | |
| 8,113,257 B2 | 2/2012 | Austermeier | |
| 8,114,240 B2 | 2/2012 | Arrington et al. | |
| 8,122,930 B2 | 2/2012 | Arrington et al. | |
| 8,157,946 B2 | 4/2012 | Arrington et al. | |
| 8,233,668 B2 | 7/2012 | Jing et al. | |
| 8,456,646 B2 | 6/2013 | Cronk et al. | |
| 8,464,771 B2 | 6/2013 | Howarth et al. | |
| 8,570,356 B2 | 10/2013 | Tamkin | |
| 8,882,955 B2 | 11/2014 | Brandon et al. | |
| 9,604,745 B2 | 3/2017 | Goetz | |
| 2001/0037853 A1 | 11/2001 | Anderson et al. | |
| 2002/0138355 A1 | 9/2002 | Briggs et al. | |
| 2003/0056869 A1 | 3/2003 | Tate et al. | |
| 2004/0154749 A1 | 8/2004 | Rice | |
| 2004/0186790 A1 | 9/2004 | Briggs et al. | |
| 2005/0039858 A1 | 2/2005 | Arrington | |
| 2006/0048898 A1 | 3/2006 | Christie | |
| 2006/0060293 A1 | 3/2006 | Constantine | |
| 2006/0060294 A1 | 3/2006 | Constantine | |
| 2006/0076111 A1 | 4/2006 | Spatafora et al. | |
| 2006/0113020 A1 | 6/2006 | Giacomazzi et al. | |
| 2007/0017640 A1 | 1/2007 | Constantine | |
| 2009/0173450 A1 | 7/2009 | Thatenhorst | |
| 2010/0096089 A1* | 4/2010 | Lichtenberg | B65C 9/26 156/351 |
| 2012/0040037 A1* | 2/2012 | Kwasniewski | B29C 49/04 425/150 |

FOREIGN PATENT DOCUMENTS

| | | |
|---|---|---|
| EP | 2356031 B1 | 2/2013 |
| FR | 2719283 A1 | 11/1995 |
| FR | 2725955 A1 | 4/1996 |
| FR | 2796143 A1 | 1/2001 |
| JP | H11-311947 A | 11/1999 |
| WO | 2010067337 A2 | 6/2010 |

OTHER PUBLICATIONS

International Search Report and Written Opinion for PCT/US2017/023976 dated Jul. 26, 2017 (9 pages).

* cited by examiner

LABELLER AND METHOD OF USING THE SAME

CROSS-REFERENCE TO RELATED APPLICATIONS

The subject patent application claims priority to and all the benefits of Patent Cooperation Treaty Application No. PCT/US2017/023976 filed Mar. 24, 2017, which claims priority to U.S. Provisional Patent Application No. 62/312,601 filed on Mar. 24, 2016, and U.S. Provisional Patent Application No. 62/407,687 filed on Oct. 13, 2016, all of which are herein incorporated by reference in their entireties.

BACKGROUND

One or more labelling machines may be used with a conveyor to apply labels to objects moving below the labelling machines on the conveyor. As one example, some governmental and consumer regulations require that produce, e.g., fruits and vegetables, be labelled to identify the source of origin. The labels may be plastic or paper, and may include an adhesive side that is adhered to the produce.

Down time can reduce the profitability of a produce packing house. Since produce is perishable and damageable, and since crops may be seasonal, leading to high production volume over short periods of time, it is advantageous that labelers be fast and reliable. In addition, it is important that the labelers effectively apply labels to the produce in a way to ensure that the labels remain fixed to the produce. This reduces waste and label build-up on the conveyor, and increases compliance with regulations that require labels.

DETAILED DESCRIPTION

Figure 1:
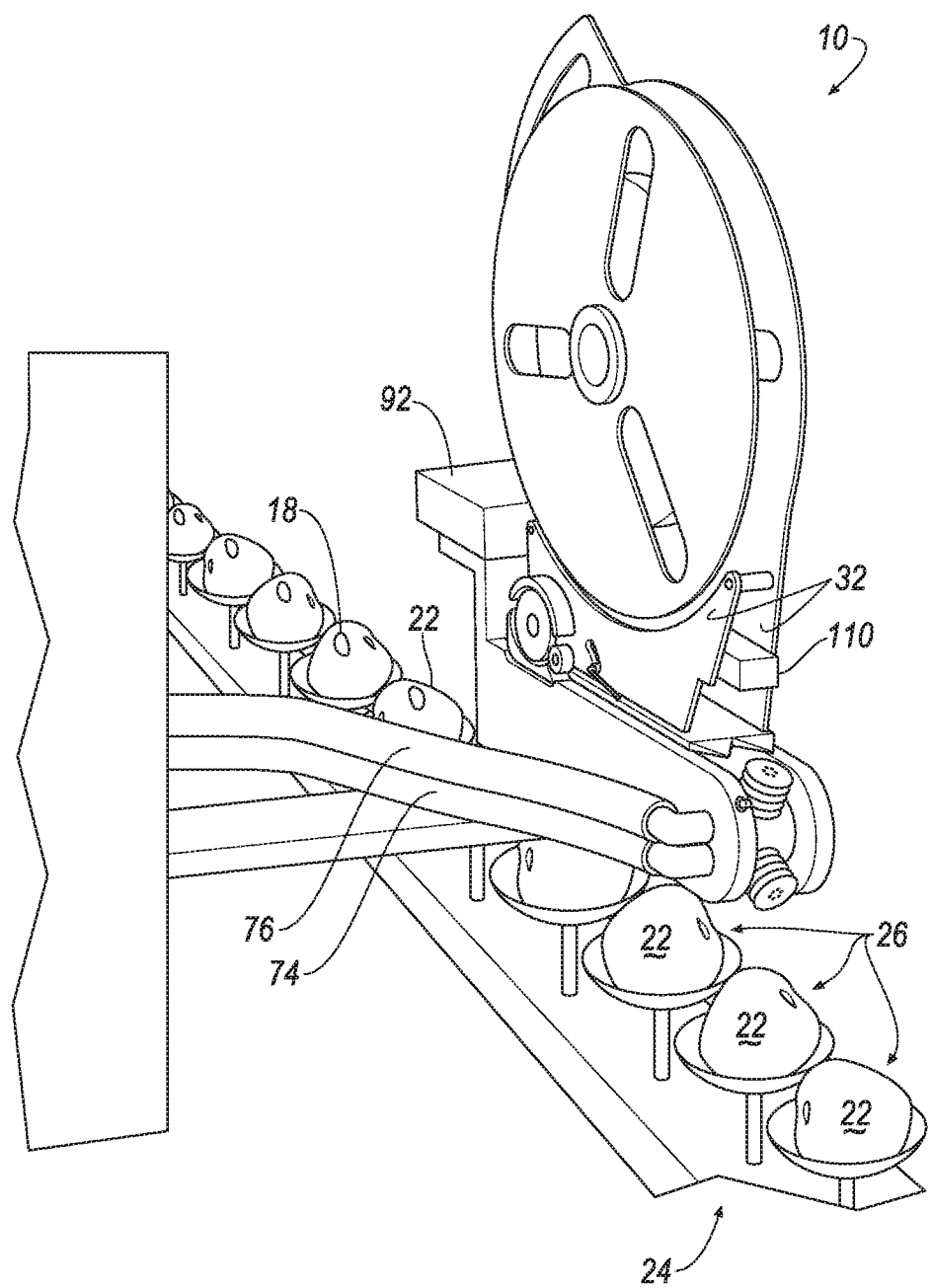
FIG. 1 is a perspective view of a labelling machine above a conveyor.
Figure 2:
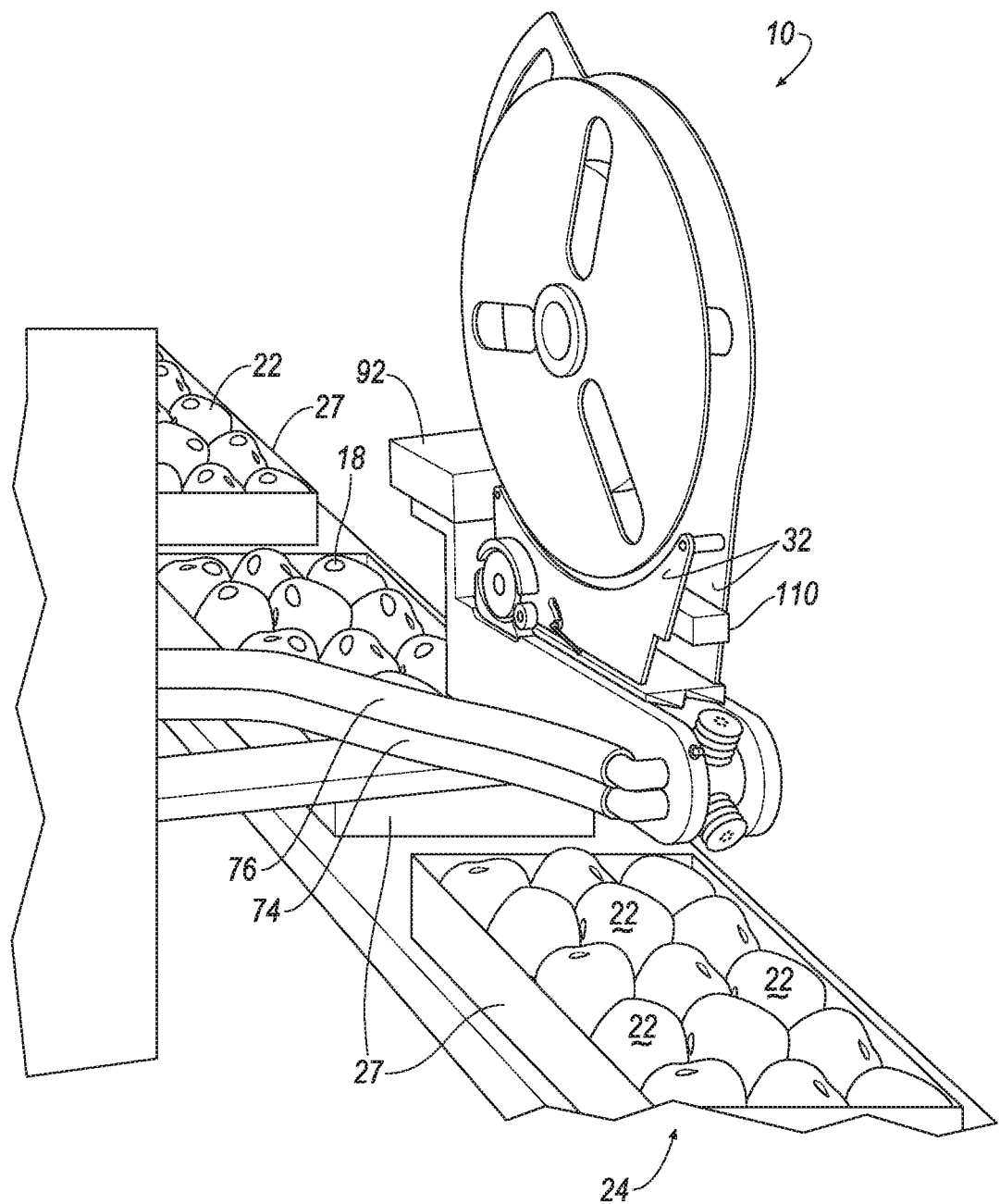
FIG. 2 is a perspective view of the labelling machine above another type of conveyor.
Figure 3:
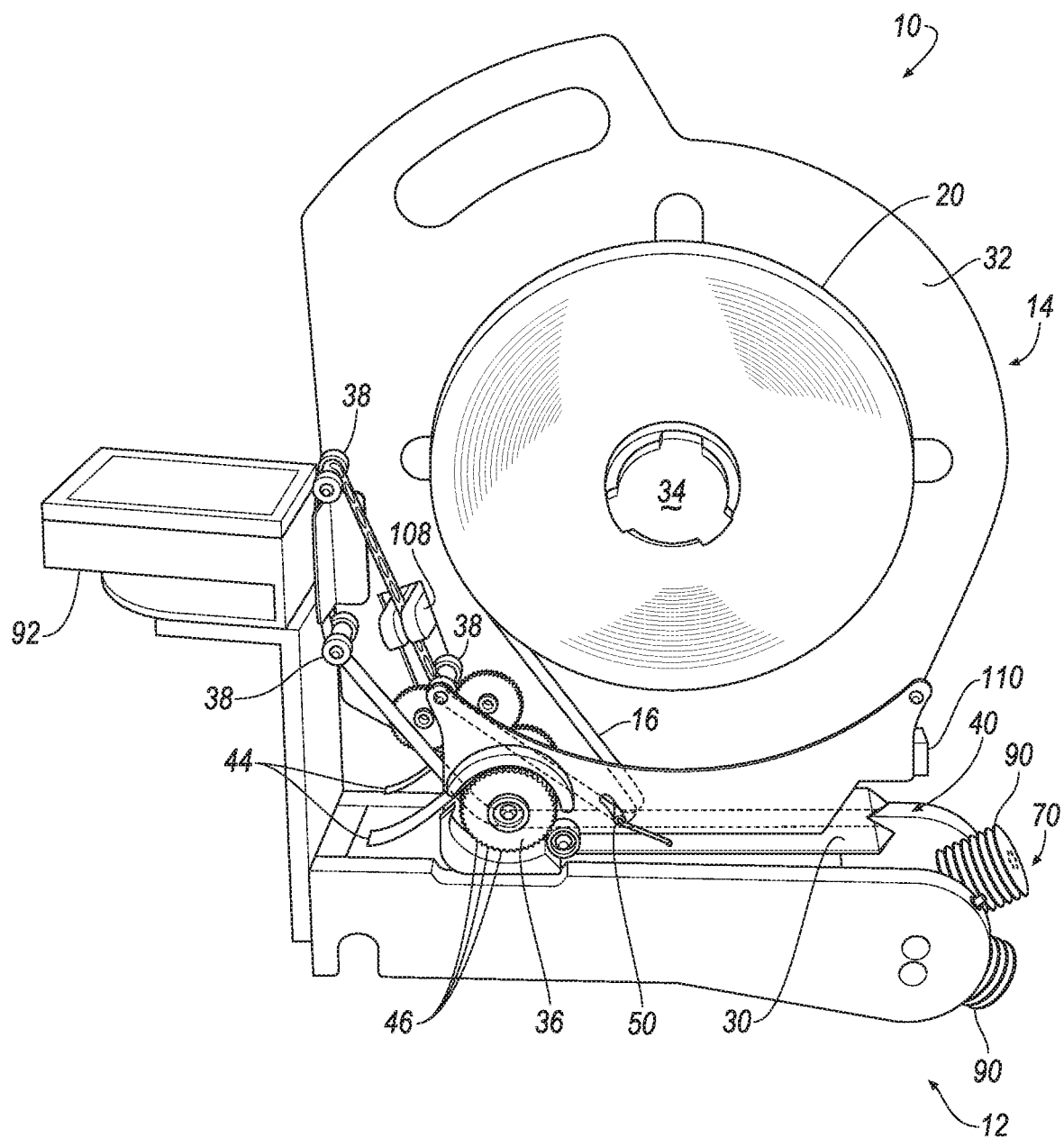
FIG. 3 is a perspective view of the labelling machine.

With reference to the Figures, wherein like numerals indicate like parts throughout the several views, a labelling machine 10 is generally shown. With reference to FIGS. 1-3, the labelling machine 10 includes a base 12 and a cassette 14 supported by the base 12. The cassette 14 supports a liner 16 that supports labels 18. The liner 16 is initially in a roll 20 around the cassette 14, and is unrolled to expose the labels 18 for application of the labels 18 onto objects 22, e.g., produce such as fruits, vegetables, etc.

With reference to FIG. 1, the labelling machine 10 may be disposed above a conveyor 24 that moves the objects 22 below the labelling machine 10. In this example, the labelling machine 10 applies a label 18 to each object 22 that moves below the labelling machine 10. The conveyor 24 may move spots 26, each sized to receive only a single object 22, below the labelling machine 10. The spots 26 may be separated from each other. In one example, as shown in FIG. 1, the spots 26 may be a part of the conveyor 24. Specifically, in such an example, the spots may be compartments, i.e., with side walls, or may be cups, i.e., may be cup-shaped, as shown in FIGS. 1 and 15A-C. As another example, as shown in FIG. 2, the spots 26 may be defined by a tray 27 that is carried on the conveyor 24. In such an example, the spots 26 may each be depressions in the tray 27 that retain an object 22 in each depression.

The conveyor 24 may determine whether each spot 26 is occupied by an object 22 or not occupied by an object 22, i.e., is occupied or unoccupied. As another example, in addition to determining whether each spot 26 is occupied or unoccupied, the conveyor 24 may grade the objects 22 based on, for example, the size of the objects 22 on the conveyor 24. The conveyor 24 may determine whether each spot 26 is occupied or unoccupied, and/or the grade of each object 22, upstream of the labelling machine 10, i.e., before the object 22 passes below the labelling machine 10.

The conveyor 24 may include one or more sensors that sense whether each spot 26 is occupied or unoccupied and/or the grade of each object 22. The conveyor 24 may provide signals to the labelling machine 10 indicating the presence of an object 22 in a spot 26, e.g., an occupied signal or an unoccupied signal, and/or the grade of the object 22, e.g., a signal indicating that the object 22 is of an appropriate grade to be labelled. For example, the conveyor 24 may include a computer 28 that receives the signal from the sensors that sense the presence of an object 22 and/or the grade of the object 22. The computer 28 of the conveyor 24 may provide a signal to the labelling machine 10 indicating the presence of an object 22 and/or the grade of the object 22. For example, the sensors that sense the presence of an object 22 and/or the grade of the object 22 may be, for example, photosensors, laser sensors, weight sensors, color sensors, etc. For example, with reference to the example, conveyor 24 of FIG. 1, these types of sensors may be on or aimed at the cups. Similarly, these types of sensors may be used with the example conveyor 24 of FIG. 2. As another example, the sensors that sense the presence of an object 22 and/or the grade of the object 22 may be, for example, a vision system that visually detects the presence of an object 22 on the conveyor 24. Specifically, the vision system may include cameras to visually detect the presence of an object 22 on the conveyor 24. For example, with reference to the example conveyor 24 of FIG. 2, such a vision system may detect the location of objects 22 on the tray 27.

As shown in FIG. 1, one labelling machine 10 may be fixed above the conveyor 24. Alternatively, more than one labelling machine 10 may be arranged in one or more banks above the conveyor 24, in which instance the conveyor 24 may include a plurality of lanes. In such an example, the labelling machine 10 and/or the bank of labelling machines 10 may be moveable relative to the conveyor 24 to appropriately position the labelling machine 10 over the lanes.

The liner 16 is typically a one-piece liner 16 initially rolled onto the cassette 14. The liner 16 may be, for example, plastic (such as polyethylene, polypropylene, etc.), paper, glassine, etc. The liner 16 may include a line of weakness, best shown in FIG. 5, longitudinally centered on the liner 16 to facilitate separation of halves of the liner 16 to separate the labels 18 from the liner 16, as set forth below.

The labels 18 may be plastic (such as polyethylene, polypropylene, polyolefin, direct thermal, laser-reactive, polyvinyl, polystyrene) or paper. The labels 18 may be aligned with each other laterally on the liner 16 and may be spaced from each other longitudinally along the liner 16. Each label 18 may be on the line of weakness. Each label 18 may include an adhesive side and an information side. Adhesive on the adhesive side releasably secures the labels 18 to the liner 16. The label 18 is applied to the object 22 with the adhesive side facing the object 22, and the adhesive adheres the label 18 to the object 22. The information side includes visual indicia indicating, for example, origin of source of the object 22, e.g., country and/or region of harvest of produce. The visual indicia may include text, optical machine readable data (e.g., a barcode), and/or invisible machine readable data (e.g., DNA embedded readable data such as in printable inks). As set forth below, the visual indicia on the label 18 may be printed on the label 18 by the labelling machine 10.

The labels 18 may be of any suitable shape, e.g., round, circular, oval, etc. In the case of the labels 18 being oval, the longitudinal axis of the label 18 may be parallel to or perpendicular to the longitudinal axis of the liner 16.

The cassette 14 is supported by the base 12, i.e., directly on the base 12 (as shown in the Figures) or indirectly through an intermediate component. The cassette 14 may be removably engageable with the base 12, as shown in FIG. 4.

The cassette 14 includes a peel plate 30, panels 32 fixed relative to the peel plate 30, and a core holder 34 supported by the panel 32. The core holder 34 may be rotatable relative to the panel 32 or may be fixed relative to the panel 32. As set forth further below, the cassette 14 includes a wheel 36 and pulley wheels 38, 50 for guiding the liner 16 to the peel plate 30 to expose the labels 18 for application of the labels 18 onto the objects 22.

Figure 4:
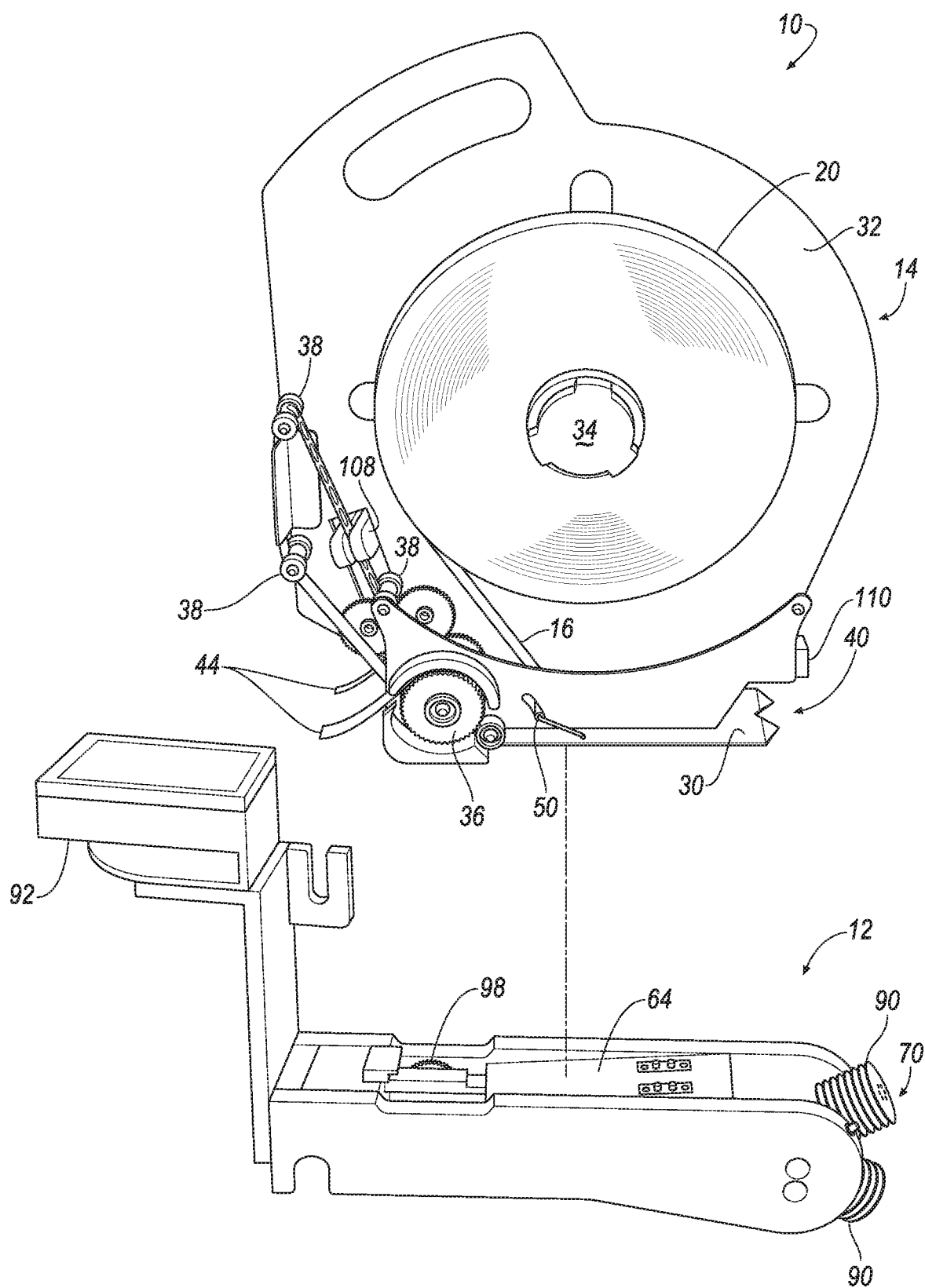
FIG. 4 is a partially exploded view of the labelling machine with a base and a cassette of the labelling machine separated from each other.
Figure 5:
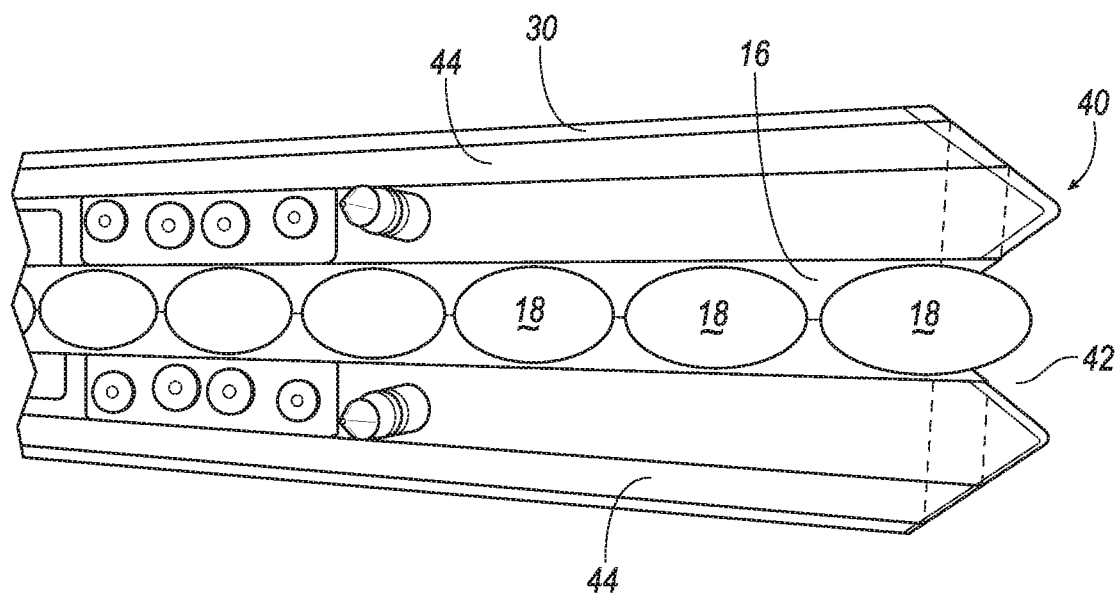
FIG. 5 is a bottom view of a peel plate of the cassette of the labelling machine.

With reference to FIGS. 4 and 5, the peel plate 30 may be supported by the base 12, i.e., directly on the base 12 (as shown in the Figures) or indirectly through an intermediate component. The peel plate 30 has a dispensing end 40. As one example, the dispensing end 40 may include a notch 42. The notch 42 may be V-shaped. With reference to FIG. 5, the liner 16 may be split at the notch 42 to separate the label 18 from the liner 16. In that example, the split halves 44 of the liner 16 are wrapped around the dispensing end 40 and, as the split halves 44 of the liner 16 are pulled, as described below, the unsplit portion of the liner 16 is advanced toward the notch 42 to expose labels 18. As another example, the dispensing end 40 may be straight.

With reference to FIGS. 1-3 and 5, the cassette 14 includes the wheel 36. The wheel 36 is rotatably supported by the panels 32. The wheel 36 may be barrel-shaped, i.e., cylindrical, and may include two sets of spikes 46 spaced from each other. Each of the sets of spikes 46 are arranged annularly about the wheel 36. As described below, the sets of spikes 46 engage the split halves 44 of the liner 16, respectively, to pull the liner 16.

The wheel 36 includes a grip-enhancing peripheral surface 48 that extends between the two sets of spikes 46 and annularly about the wheel 36. For example, the grip-enhancing peripheral surface 48 is a dimpled surface. The dimpled surfaced includes dimples configured to enhance surface grip between the liner 16 and the wheel 36. Whether with or without dimples, the grip-enhancing peripheral surface 48 may be silicone. When the grip-enhancing peripheral surface 48 is the dimpled surface, the dimpled surface, e.g., the entire surface or just the dimples, may be silicone. As other examples, the grip-enhancing peripheral surface 48 may be roughened, e.g., with grit like sandpaper, sticky, etc. The grip-enhancing peripheral surface 48 eliminates the need for die-cut holes in the liner 16 (e.g., for use with a pin-driven wheel) or any other features, such as wavy edges of the liner 16, to move the liner 16.

The cassette 14 includes a plurality of pulley wheels 38, 50. FIG. 3 shows the path of the liner 16 around the grip-enhancing peripheral surface 48 and the pulley wheels 38, 50, and along the peel plate 30 to the sets of spikes 46 on the wheel 36. The pulley wheels 38, 50 may include fixed pulley wheels 38, which are fixed along a rotational axis to the plate of the cassette 14, and may include a moveable pulley wheel 50 (also referred to as a "dancing arm"). The moveable pulley wheel 50 may be movably engaged in slots in the panels 32, and a spring, e.g. a coil spring, may connect the moveable pulley wheel 50 to at least one of the plates. The spring biases the movable pulley wheel 50 toward one end of the slots, and resiliently stretches to give slack to the liner 16 when tension on the liner 16 exceeds the spring force of the spring.

With continued reference to FIG. 3, the liner 16 is initially in a roll on the core holder 34. The liner 16 is unrolled in a path that extends around the movable pulley wheel 50 and across the grip-enhancing peripheral surface 48 of the wheel 36, i.e., in contact with the grip-enhancing peripheral surface 48. The liner 16 extends from the grip-enhancing peripheral surface 48 and around the fixed pulley wheels 38. The fixed pulley wheels 38 may direct the liner 16 across the path of a printer 92, as described below. From the fixed pulley wheels 38, the liner 16 extends along a bottom surface of the peel plate 30 to the dispensing end 40. The liner 16 is split at the dispensing end 40 and the split halves 44 of the liner 16 extend along the bottom surface to the sets of spikes 46, respectively. The sets of spikes 46 engage the respective split halves 44, i.e., the sets of spikes 46 pierce the respective split halves 44. The wheel 36 is rotated, i.e., counter-clockwise in FIG. 3, and the sets of spikes 46 pull the split halves 44 to pull the unsplit liner 16 on the bottom of the peel plate 30 toward the dispensing end 40. As a label 18 approaches the dispensing end 40, e.g., the notch 42, and the liner 16 is split, the label 18 is released from the liner 16 and exposed for removal from the liner 16, as set forth below. Since the liner 16 is in contact with the grip-enhancing surface, the grip-enhancing surface pulls the away from the core holder 34 and toward the dispensing end 40, and ultimately the sets of spikes 46, to reduce tension in the liner 16 between the core holder 34 and the sets of spikes 46.

The core holder 34 may be expandable to fit rolls of liner 16/labels 18 having different sized holes. Specifically, the core holder 34 may include a base member 52 rotatably engaged with the panel 32, and fingers 54 that are retractable relative to the base member 52. The base member 52, for example, may have channels that receive the fingers 54, and springs, e.g., coil springs, may be disposed between the base member 52 and the fingers 54 to resiliently bias the fingers 54 away from the base member 52. As the roll 20 of liner 16/labels 18 are inserted onto the core holder 34, the roll 20 biases the fingers 54 into the channels against the resilient bias of the springs. Since the fingers 54 are expandable relative to the base member 52, the core holder 34 may be used with rolls 20 of liner 16/labels 18 of different sizes on a single cassette 14, i.e., without the need for multiple cassettes each used for different size liners 16/labels 18. As another example, the core holder 34 may have a fixed diameter, i.e., be a post.

The cassette 14 may include a brake 56 engaged with the core holder 34 for managing the tension in the liner 16 as the liner 16 is pulled from the core holder 34. As the liner 16 is pulled, the diameter of the roll 20 of liner 16/labels 18 eventually becomes smaller. As the diameter of the roll 20 becomes smaller, the rotational speed of the roll 20 and the core holder 34 increases. The brake 56 increases resistance against the pull of the liner 16 by the wheel 36 as the diameter of the roll decreases.

As one example the brake 56 may include a magnetic clutch that drags on the rotation of the core holder 34 to create tension in the liner 16 as the wheel 36 pulls the liner 16. As the rotational speed of the roll 20 and the core holder 34 increases, the magnetic clutch provides increased resistance to the liner 16.

The brake 56, e.g., the magnetic clutch, may include an aluminum plate 58 rotatable relative to the panel 32 by the core holder 34. Specifically, the core holder 34 may be rotatable by the core holder 34 through gears that are fixed to the panel 32. One of the gears extends through the panel 32 to the center of the aluminum plate 58.

The aluminum plate 58 is spaced from the panel 32, and the brake 56 may include a magnet 60 on the panel 32 between the panel 32 and the aluminum plate 58. The magnet 60 may be spaced from the aluminum plate 58, and the aluminum plate 58 is within the magnetic field of the magnet 60. As the liner 16 is pulled from the roll 20, the aluminum plate 58 rotates relative to the magnet 60, and the magnet 60 provides resistance to the rotation of the aluminum plate 58, which resists rotation of the core holder 34 because the aluminum plate 58 is engaged with the core holder 34 through the gears 62. The resistance provided by the magnet 60 to the aluminum plate 58 is increased as the diameter of the roll 20 decreases, i.e., as the rotational speed of the roll 20 and the core holder 34 increases. In other words, the brake 56 may be an eddy current brake.

Figure 8:
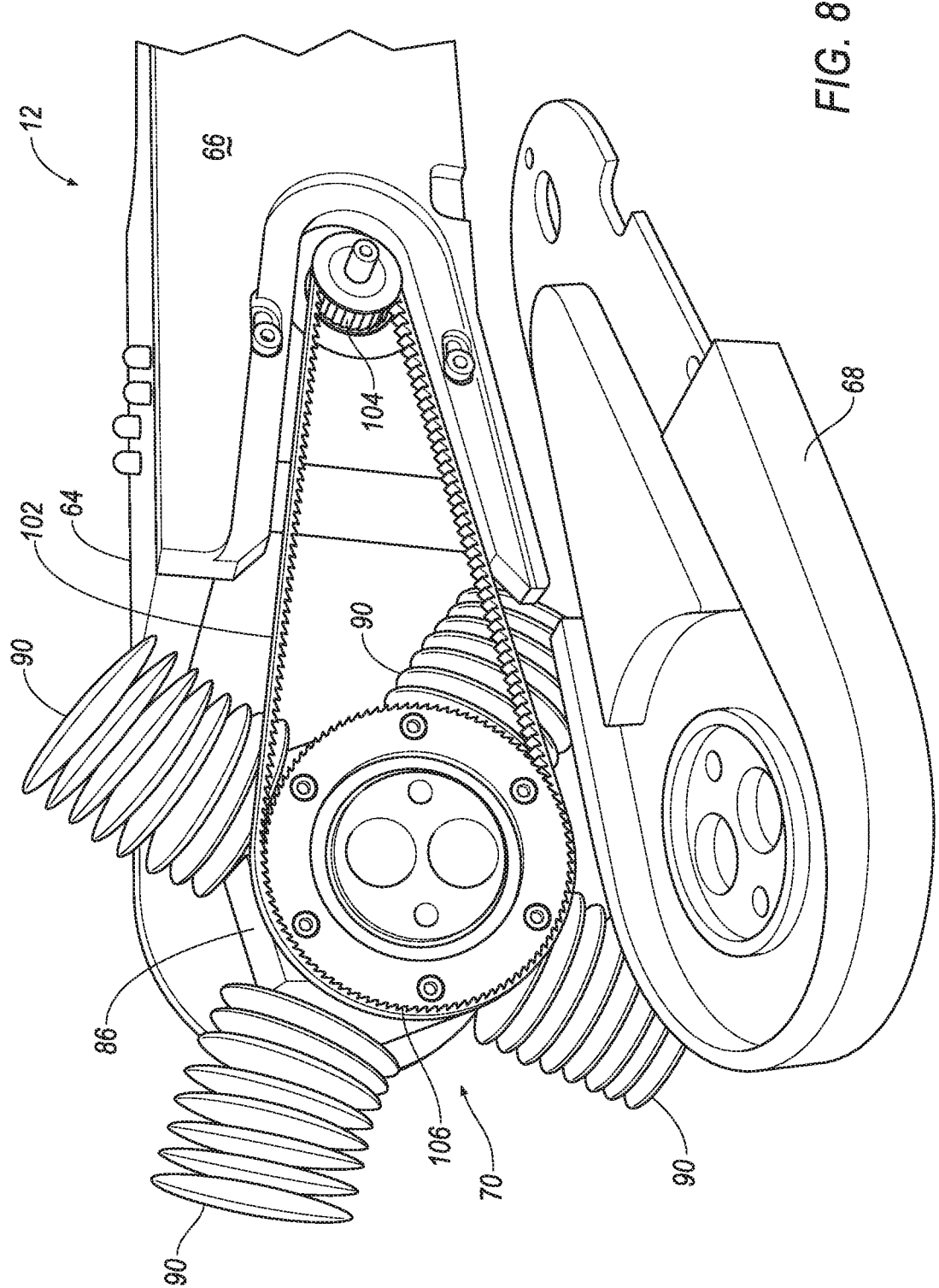
FIG. 8 is another perspective view of a portion of the base with a removable panel removed from a side plate of the base.

With reference to FIGS. 4 and 8, the base 12 includes a housing 64 that supports and/or protects several components of the labelling machine 10. The base 12 may include a side plate 66 that is removably attached to the housing 64, e.g., with removeable fasteners such as threaded fasteners. The base 12 may include a removable panel 68 that is removably attached to the side plate 66, e.g., with removeable fasteners such as threaded fasteners. The removable panel 68 may be easily and quickly removed from the side plate 66 to service the base 12, e.g., to repair or replace a belt 102, a turret 70, and/or a turret motor 94. The base 12 may be formed of any suitable material, e.g., metal such as aluminum.

Figure 7:
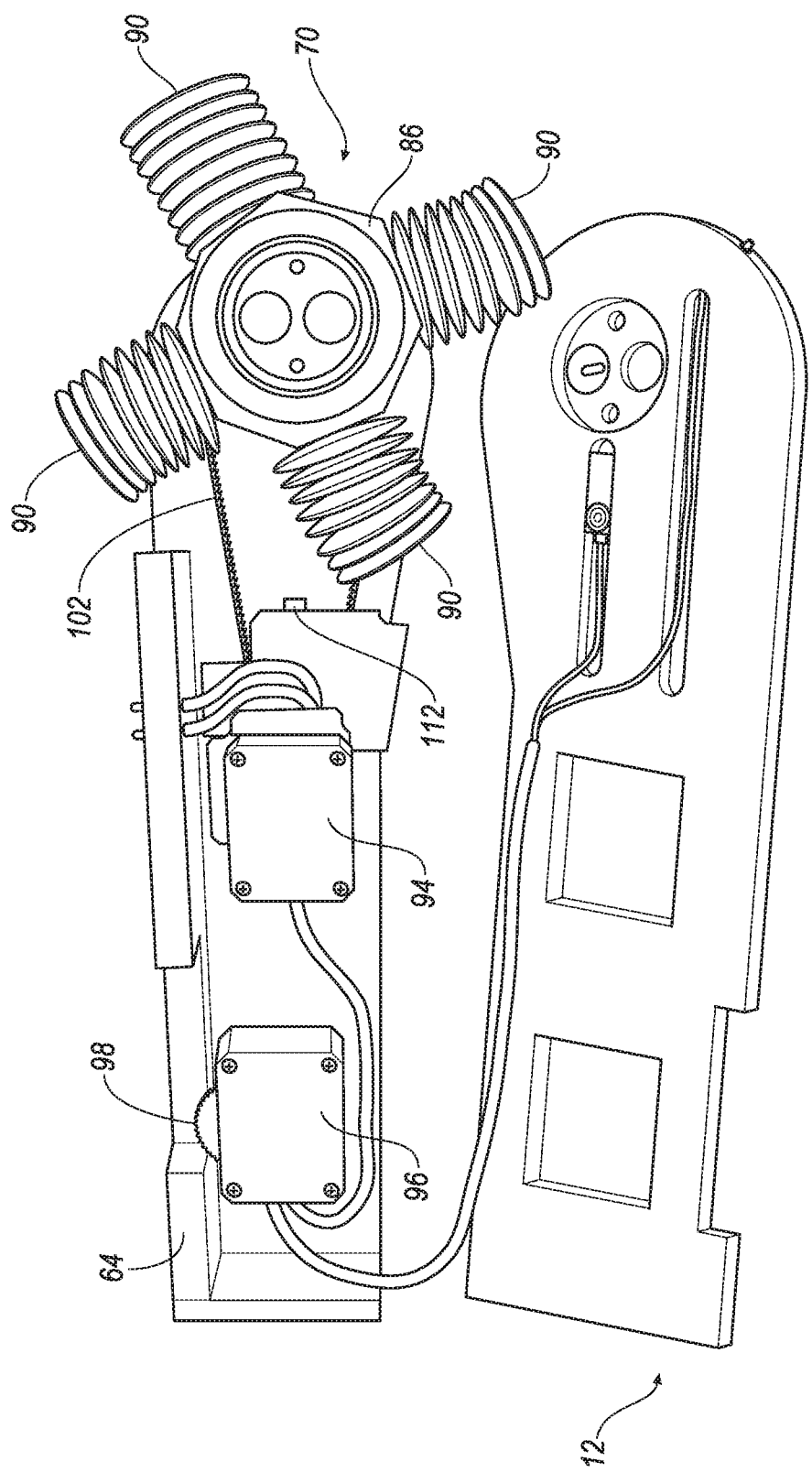
FIG. 7 is a perspective view of the base with a side plate removed to expose the components in the base.

With reference to FIGS. 7 and 8, the labelling machine 10 includes a turret 70 rotatably supported by the base 12. The turret 70 picks up labels 18 at the dispensing end 40 of the peel plate 30 with the use of vacuum, rotates to position the labels 18 in a position above and facing the conveyor 24, and then dispenses the labels 18 on the objects 22 with the use of positive pressure.

Figure 9:
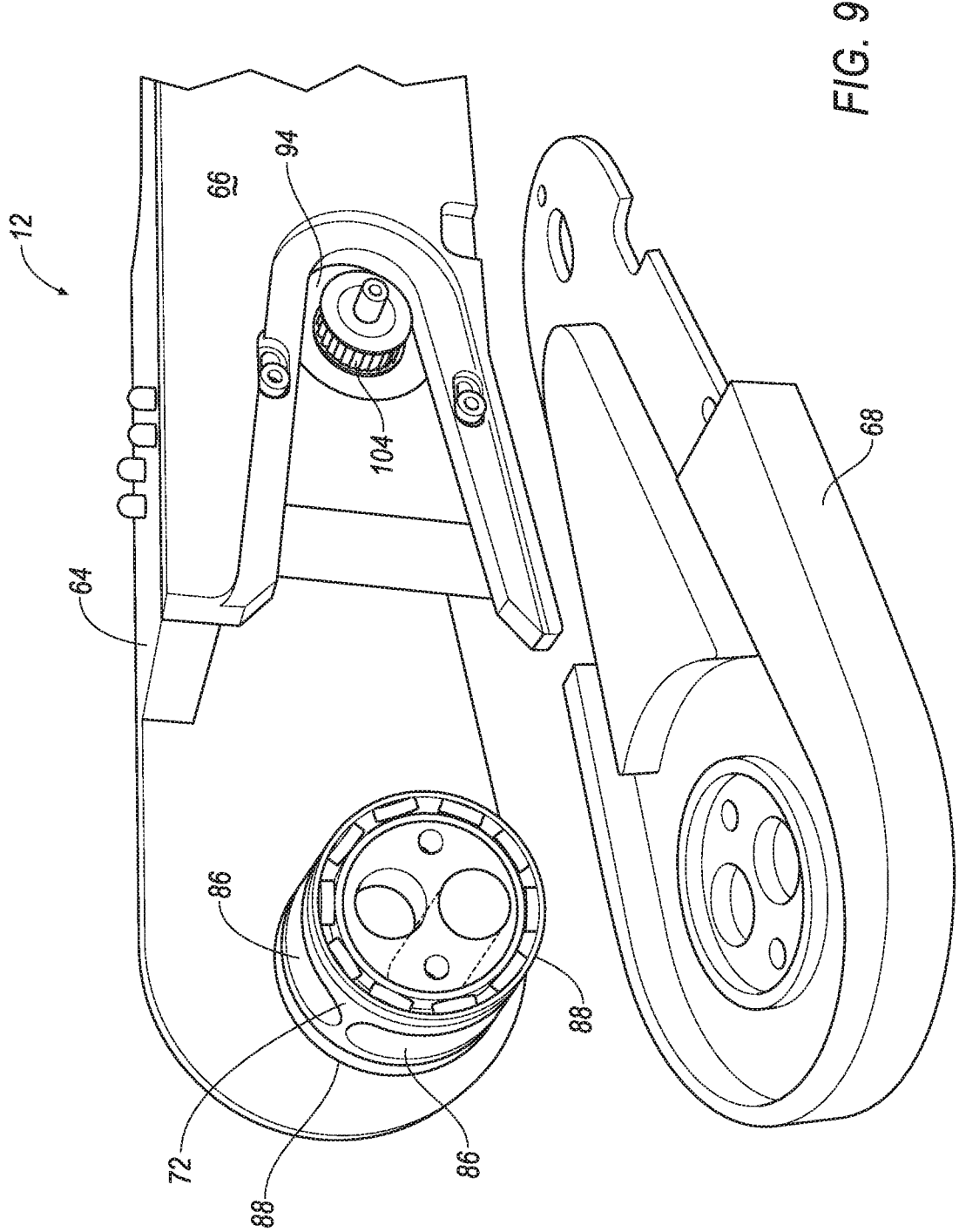
FIG. 9 is another perspective view of the base with a turret removed to show an axle.
Figure 10:
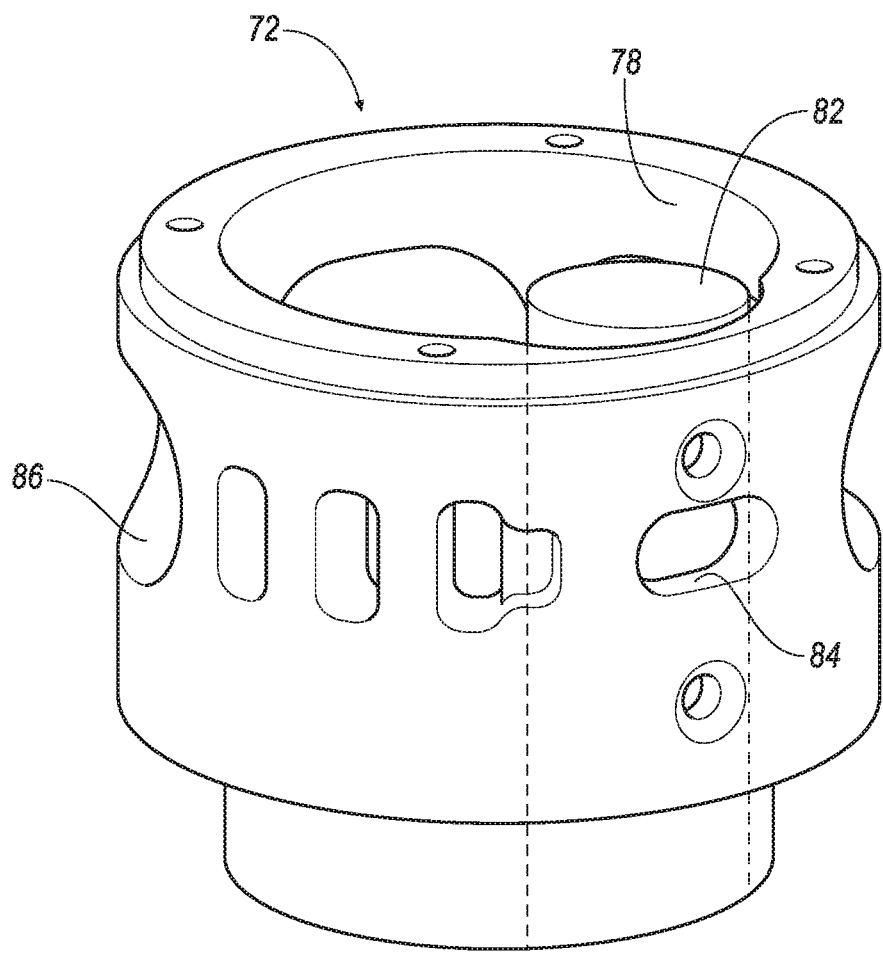
FIG. 10 is a perspective view of the axle.
Figure 11:
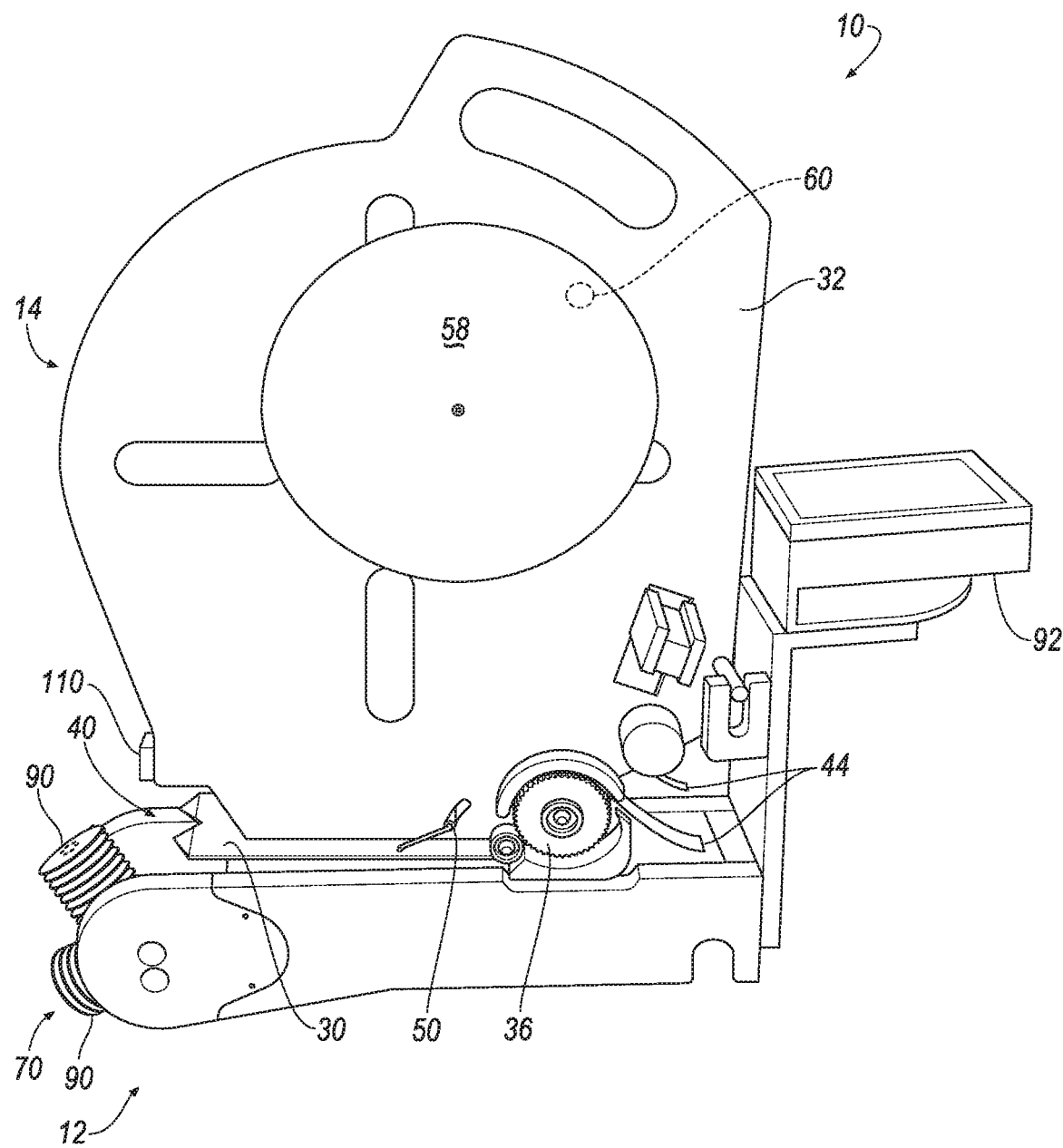
FIG. 11 is a perspective view of one side of the labelling machine including a brake.
Figure 12:
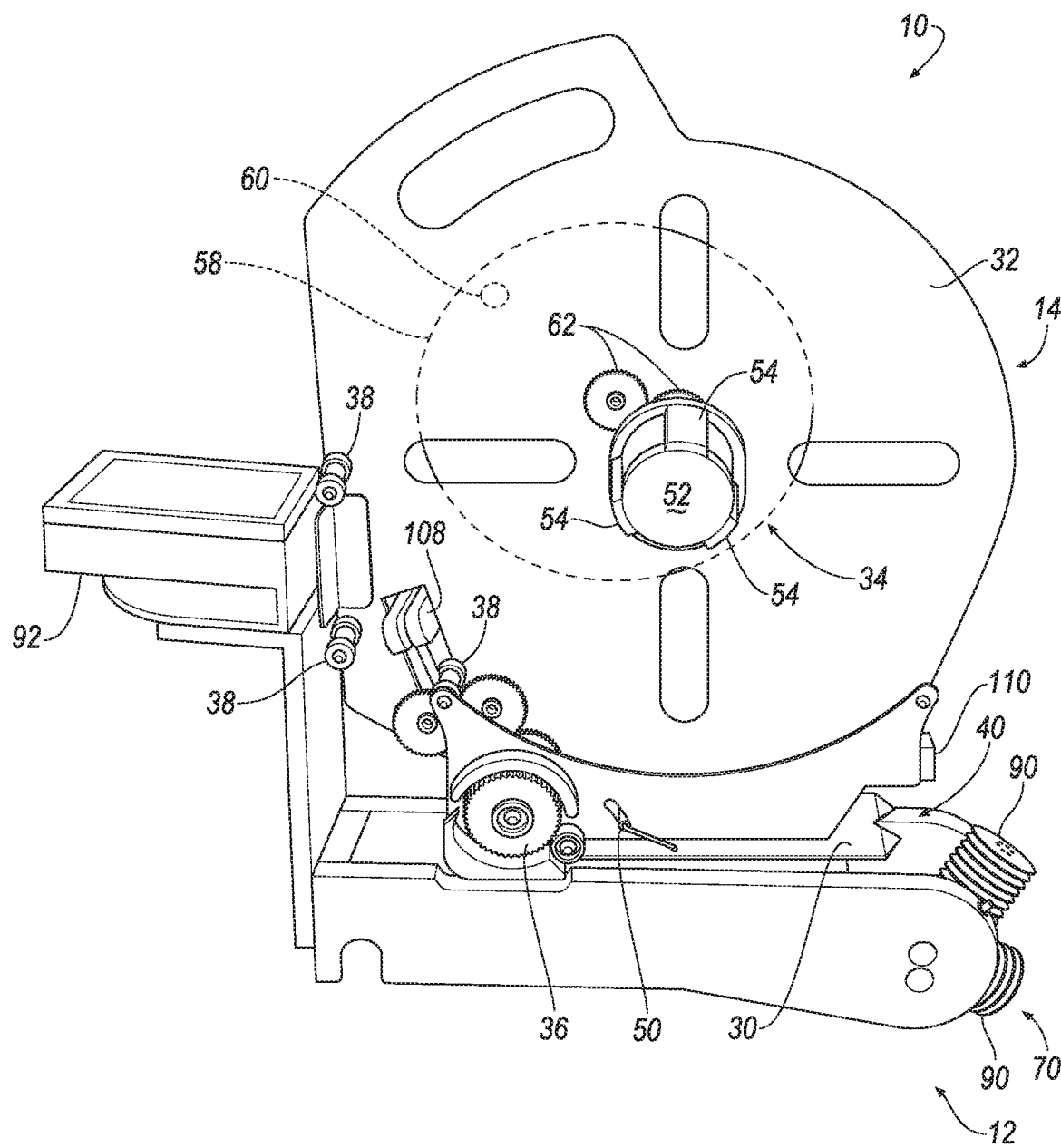
FIG. 12 is a perspective view of another side of the labelling machine including the brake.

With reference to FIGS. 9 and 10, the base 12 includes an axle 72 fixed relative to the housing 64. The axle 72 is coupled to a vacuum line 74 and a positive pressure line 76, as shown in FIG. 1, which provide vacuum and positive air pressure, respectively, to the axle 72.

The axle 72 includes a main chamber 78 in fluid communication with the vacuum line 74. The axle 72 includes vacuum ports 80 extending through the periphery of the axle 72 to fluidly communicate with the turret 70. The axle 72 also includes a tube 82 in fluid communication with the positive pressure line 76. The tube 82 is in fluid communication with a pressure port 84 extending through the periphery of the axle 72 to fluidly communicate with the turret 70.

The turret 70 includes an outer hub 86 receiving the axle 72. Bearings 88 are disposed between the axle 72 and the outer hub 86. The bearings 88 may space the outer hub 86 from the axle 72. In other words, the outer hub 86 does not contact the axle 72, and instead, the bearings 88 are between the outer hub 86 and the axle 72 and positioned to prevent contact between the outer hub 86 and the axle 72.

The outer hub 86 includes holes, and the turret 70 includes bellows 90 connected to each hole. As set forth below, the holes communicate vacuum or positive pressure from the axle 72 to the bellows 90. The bellows 90 include air holes for communicating the vacuum to the label 18 to hold the label 18 on the bellow 90. The bellows 90 may each include a one-way valve at the air holes for retaining positive pressure in the bellows 90. Each bellow 90 has an accordion-shape, i.e., convolute-shape, that expands when positive pressure builds in the bellow 90. The turret 70 may include any suitable number of holes and bellows 90, e.g., four as shown in the Figures. The use of four bellows 90, as shown in the Figures, is a reduction in the number of bellows 90, which reduces the change-over and repair time and cost.

As the outer hub 86 rotates relative to the axle 72, the holes of the outer hub 86 are in fluid communication with the main chamber 78, i.e., vacuum, or in fluid communication with the tube, i.e., the positive pressure. The pressure port 84 faces downwardly toward the conveyor 24, and the vacuum ports 80 are discontinuous and spaced from each other around the axle 72. As one of the holes of the outer hub 86 is in communication with the vacuum ports 80, the vacuum compresses the accordion-shape of the bellow 90 and, when the bellow 90 reaches the dispensing end 40 of the peel plate 30, the bellow 90 picks up a label 18 with the vacuum drawn through the air holes. After picking up a label 18, the outer hub 86 continues to rotate and vacuum is continued to be drawn in the bellow 90 through the hole. When the hole reaches the pressure port 84, the positive pressure is communicated through the hole to the bellow 90 to expand the accordion-shape of the bellow 90, which moves the label 18 toward the object 22. The adhesive of the label 18 faces away from the bellow 90, and the adhesive adheres to the object 22 as the object 22 moves below the bellow 90 and the bellow 90 expands toward the object 22.

Figure 15A:
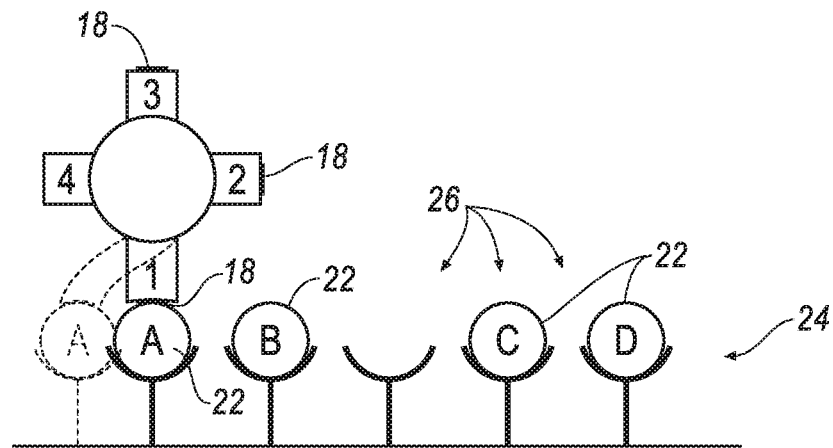
FIG. 15A-C are three schematic views showing the progressive operation of the labelling machine and the conveyor.
Figure 15B:
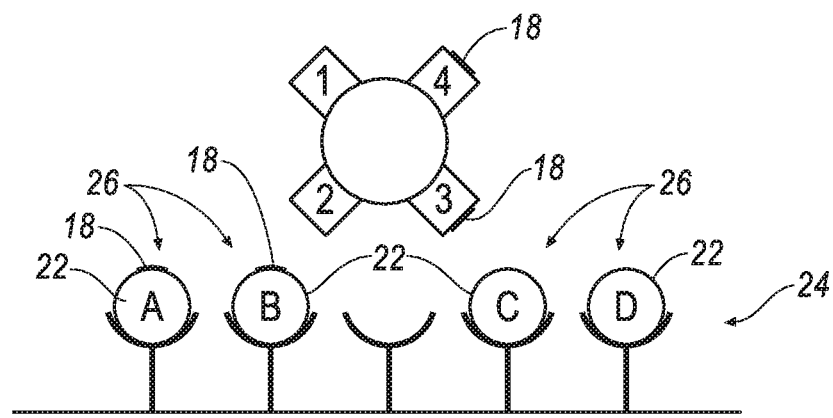
Figure 15C:
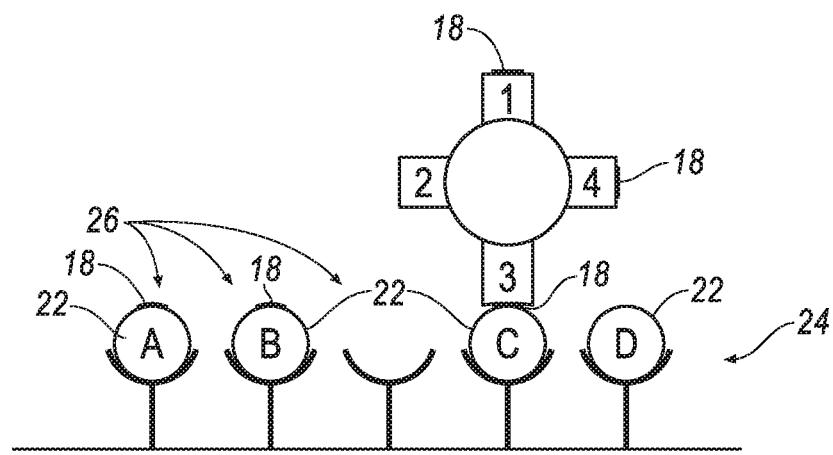

The turret 70 is movable in one direction between a plurality of application positions. Specifically, the number of application positions equals the number of bellows 90, e.g., four in the example shown in the Figures, as the turret 70 rotates in the same direction. In each application position, one of the bellows 90 is aligned with, and in fluid communication with, the pressure port 84. As described below, the turret 70 can selectively slow at an intermediate position between two consecutive application positions. In other words, the rotation of the turret 70 may slow to a reduced speed, or may stop, at the intermediate position, before subsequently moving to the next application position after receiving an instruction to do so. Two application positions, for example, are shown in FIGS. 15A and 15C. An intermediate position is shown in FIG. 15B.

The bellows 90 may be any suitable material, e.g., rubber, silicone, etc. The bellows 90 may be easily engaged and disengaged from the holes, e.g., the bellows 90 may have a flexible rib that may be press fit to the hole, and may be removed from the hole by pulling with sufficient force to deform the rib. The easy engagement/disengagement of the bellows 90 to the outer hub 86 facilitates quick repair/replacement of individual bellows 90, and allows for the bellows 90 to be removed and replaced with bellows 90 of different sizes. For example, larger diameter bellows 90 may be used for larger produce that may receive a larger label 18, e.g., melons, and smaller diameter bellows 90 may be used for smaller produce that may receive a smaller label 18, e.g., limes.

As set forth above, the labelling machine 10 may include the printer 92. The printer 92 may be in communication with a computer 28 of the labelling machine 10. The printer 92 may be supported by the base 12. As described above, the labelling machine 10 may be configured to guide the labels 18 to a position adjacent the printer 92 such that the printer 92 may print information on the label 18. The printer 92 may be any suitable type of printer 92 for information such as text, bar codes, etc., on the labels 18. The printer 92 may be, for example, an inkjet printer, a thermal transfer printer, a direct thermal printer, etc.

The labelling machine 10 may, for example, include two motors. In such an example, the labelling machine 10 includes a turret motor 94 and a label advancement motor 96. The adjectives "first" and "second" are used herein with reference to the motors merely for identification, and not to indicate order or importance. The turret motor 94 rotates the turret 70 relative to the axle 72. The label advancement motor 96 rotates the wheel 36 to pull the liner 16 and advance the labels 18. Each of the motors may be supported by the base 12 in the housing 64. As another, the labelling machine 10 may include any suitable number of motors, i.e., one or more.

As described below, the labelling machine 10 may include the computer 28 that controls the motors. The computer 28 may independently control the turret motor 94 and the label advancement motor 96. In other words, the turret motor 94 and the label advancement motor 96 may be turned on or off and/or may be operated at different speeds independently of each other. Each motor 94, 96 may be a stepper motor, a hybrid step motor, a C-type computer 28 programmable motor, a servo motor, or any other suitable type of motor. The computer 28 may be separate from the motors 94, 96, or alternatively, the computer 28 may be incorporated into the motors 94, 96. The motors 94, 96 and/or the computer 28 may be programmed to use motion tracking to base movement off the current position of the motors 94, 96. This allows for the use of less processing power, which allows the motors 94, 96 to respond quickly and reduces the likelihood that the motors 94, 96 lose position.

Figure 6:
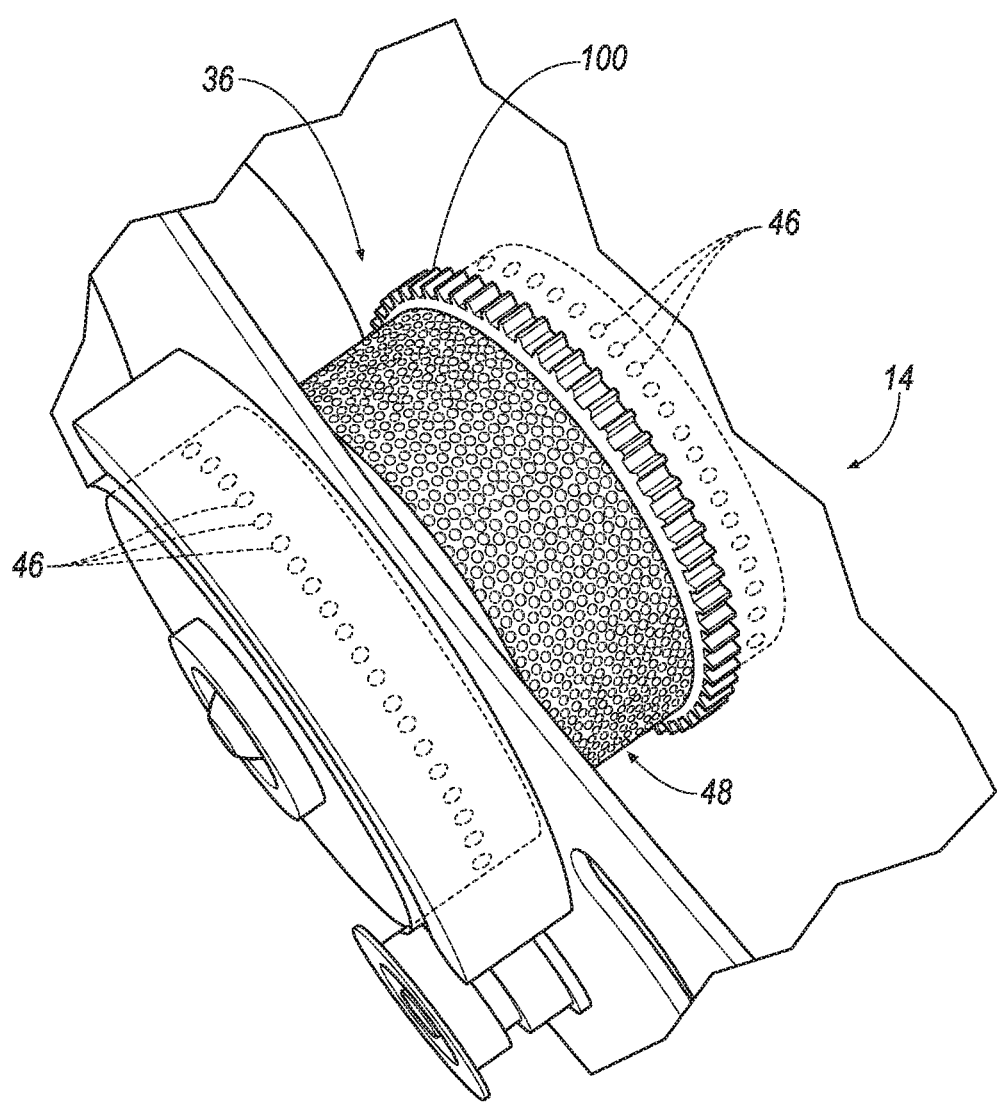
FIG. 6 is a perspective view of a wheel of the cassette.

As shown in FIGS. 6 and 7, the label advancement motor 96 may include a gear 98 positioned to mesh with a gear 100 on the wheel 36. The gear 98 may be directly driven by the label advancement motor 96, or may be driven by one or more intermediate gears between the gear 98 and the label advancement motor 96. When meshed, the gear 98 on the label advancement motor 96 drives the wheel 36. Alternatively, the label advancement motor 96 may be engaged drive the wheel 36 in any suitable manner.

As shown in FIG. 8, the turret motor 94 may be connected to the turret 70 with a belt 102. Specifically, the turret motor 94 may include a gear, and the outer hub 86 of the turret 70 may include a gear, and each of the gears may be meshed with the belt 102. The belt 102 may be, for example, a polymeric belt 102, e.g., rubber. As another example, the belt 102 may be chain links or any other suitable type. Alternatively, the turret motor 94 may be engaged with the turret 70 in any suitable manner.

As set forth above, the base 12 includes the side panel 66 and the opening in the side panel 66. The opening is aligned with the turret motor 94 and the turret 70, and a removable panel 68 is removably connected to the side panel 66 and extends across the opening. The removable panel 68 may be removed to access the turret motor 94, the turret 70, and/or the belt 102 for repair, replacement, etc. The gear 104 of the turret motor 94 may be removeable for repair replacement. The gear 106 of the outer hub 86 of the turret 70 may be removable from the rest of the outer hub 86. For example, the gear 106 may be removably engaged with the rest of the outer hub 86 with removeable threaded fasteners.

The labelling machine 10 may include sensors for controlling the operation of the labelling machine 10 and the application of labels 18 to objects 22. The adjectives "first" and "second" are used herein with reference to the sensors merely for identification, and not to indicate order or importance.

A first label sensor 108 is disposed between the cassette 14 and the printer 92, i.e., along the path of the liner 16. For example, the first label sensor 108 may be supported by the panel 32 of the cassette 14. The first label sensor 108 is in communication with the printer 92. Specifically, the first label sensor 108 may be in communication with the computer 28, or may be in direct communication with the printer 92. The first label sensor 108 is configured to sense a label 18 upstream of the printer 92. For example, the first label sensor 108 may sense any part of the label 18, e.g., the leading edge of the label 18, the trailing edge of the label 18, the widest part of the label 18, etc. The first label sensor 108 may be, for example, a fork sensor, a photoelectric sensor, a photo-eye sensor, an opto-electric sensor, a distance sensor, etc.

The printer 92 is operable based on a signal from the first label sensor 108. Specifically, the first label sensor 108 registers each label 18 for the printer 92. The first label sensor 108 senses a label 18, e.g., a leading edge of the label 18, and, based on the known and fixed distance of the path of the liner 16 between the first label sensor 108 and the printer 92, provides an instruction to the printer 92 indicating the presence of a label 18 at the printer 92 and/or an instruction to the printer 92 to print on the label 18 present at the printer 92. The printer 92 prints while the labels 18 are moving, and the printer 92 is preprogrammed to the speed of the label advancement motor 96 to print at the proper speed of the moving label 18.

A second label sensor 110 is disposed at the dispensing end 40 of the peel plate 30. For example, the second label sensor 110 may be supported on the panel 32 of the cassette 14. The second label sensor 110 is in communication with the computer 28. The second label sensor 110 is configured to sense a label 18 at the dispensing end 40. For example, the second label sensor 110 may sense the leading edge of the label 18, i.e., the leading edge of the label 18 separated from the liner 16 at the notch 42. The second label sensor 110 may be, for example, a photoelectric sensor, a photo-eye sensor, an opto-electric sensor, a distance sensor, etc.

Figure 13:
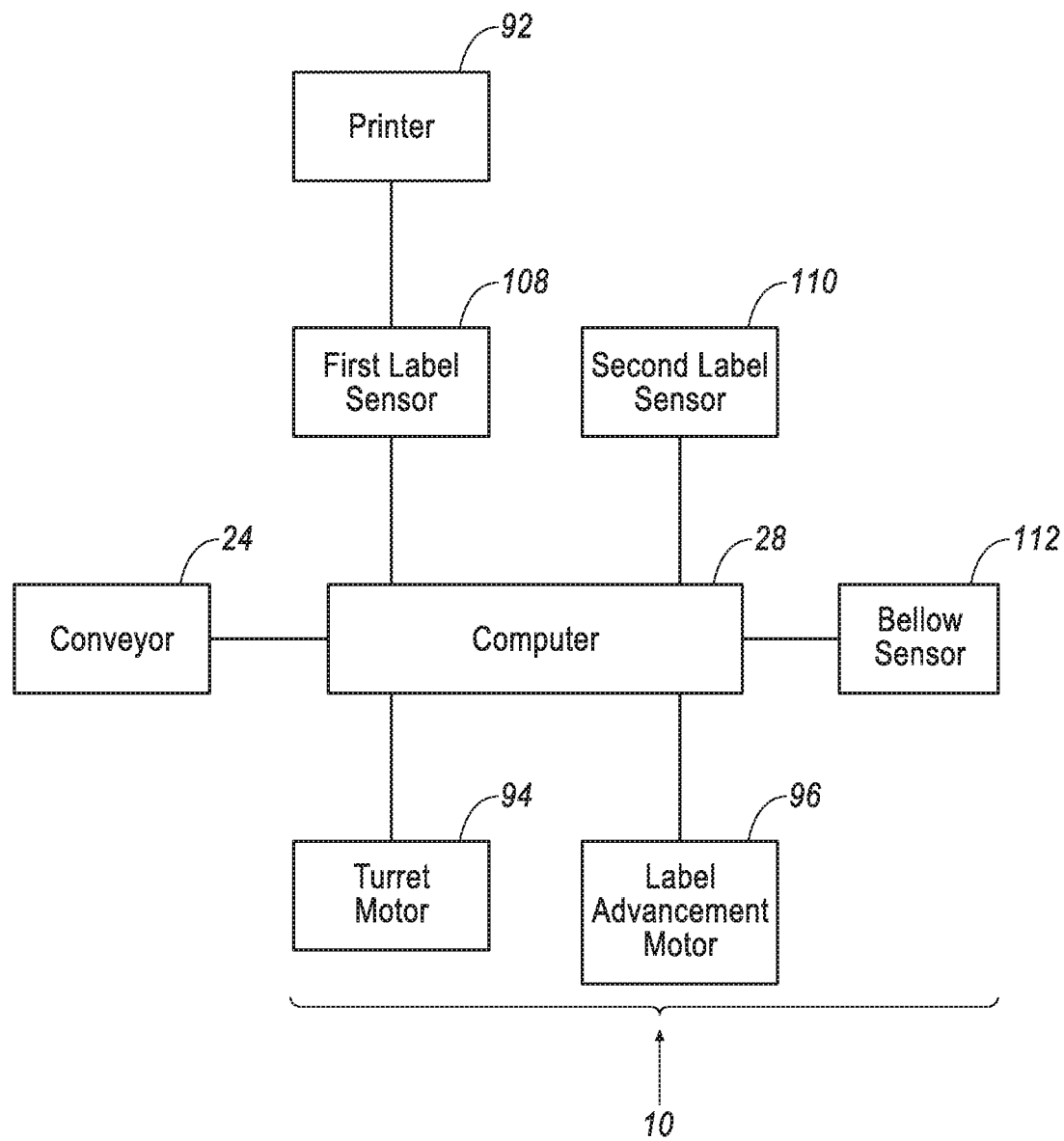
FIG. 13 is a schematic of electronic components of the labelling machine connected to the conveyor.

The labelling machine 10 may include a turret sensor 112, as shown in FIGS. 7 and 13. The turret sensor 112 senses the presence of one of the bellows 90 when that bellow 90 is adjacent the turret sensor 112, i.e., when the turret 70 is in an application position. The turret sensor 112 may be, for example, a photoelectric sensor, a photo-eye sensor, an opto-electric sensor, a distance sensor, etc.

The computer 28 is programmed to control the label advancement motor 96 based on a signal from the second label sensor 110. The computer 28 receives a signal, i.e., a stop signal, from the second label sensor 110 indicating that a label 18 is sensed at the dispensing end 40. Based on the stop signal, the computer 28 sends an instruction to the label advancement motor 96 to stop, which results in the liner 16 stopping relative to the peel plate 30. Subsequently, the computer 28 may receive an instruction from the conveyor 24 that the conveyor 24 moved past a threshold position, e.g., that an occupied spot 26 is approaching and or a threshold time has elapsed, and in response to this instruction, the computer 28 instructs the turret motor 94 and the label advancement motor 96 to start, i.e., to rotate.

The computer 28 may include a memory and a processor programmed to execute instructions stored in the memory. The computer 28 may be a programmable logic controller (PLC). The computer 28, also referred to as a controller, computing device, etc., may include computer-executable instructions. The instructions may be executable by the computer 28. Computer-executable instructions may be compiled or interpreted from computer 28 programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer 28 (e.g., by a processor of a computer 28). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire, Ethernet, serial communication, USB (universal serial bus), fiber optics, including the wires that comprise a system bus coupled to a processor of a computer 28. Example forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer 28 can read.

The instructions stored in the memory of the computer 28 include instructions to rotate the turret 70 to pick up labels 18 from the dispensing end 40 of the peel plate 30 and to move the turret 70 to the application positions to apply the labels 18 to the objects 22 on the conveyor 24. When the turret 70 is moved to one of the application positions, the label 18 on the bellow 90 in the application position is applied to the object 22 under the bellow 90. As described below, the turret 70 remains in the application position momentarily until the computer 28 receives a signal, e.g., from the conveyor 24, to move the turret motor 94. This momentary tamp and hold increases the likelihood that the adhesive on the label 18 adheres to the object 22. When the signal from the conveyor 24 indicates that the next spot 26 of the conveyor 24 is occupied, the instructions include powering the motor to rotate the turret 70 to the next application position, e.g., 90 degrees in the example shown in the Figures, in a continuous movement, i.e., without stopping at an intermediate position. When the signal from the conveyor 24 indicates that the next spot 26 of the conveyor 24 is empty, the instructions include powering the motor to rotate the turret 70 toward the next application position, and slowing the turret 70 at an intermediate position before reaching the next application position, e.g., 45 degrees in the example shown in the Figures. In other words, the rotation of the turret 70 may slow to a reduced speed, or may stop, when the turret 70 reaches the intermediate position. When in the intermediate position, the turret 70 is positioned to quickly apply a label 18 to the object 22 next spot 26 of the conveyor 24 that is occupied, at which time the instructions include powering the turret motor 94 to move the turret 70 to the next application position, e.g., 45 degrees in the example shown in the Figures. This allows, for example, the ability to apply 15 labels per second. Every time the turret 70 moves to one of the application positions, the turret motor 94 momentarily remains in the application position while waiting for the next instruction.

The instructions stored in the memory of the computer 28 includes instruction to receive a first occupied signal indicating that a first spot 26 on a conveyor 24 is occupied with a first object 22 to be labeled. The instructions also include providing instruction to the turret motor 94 to rotate the turret 70 to a first application position to apply a first label 18 to the first object 22. For example, as shown in FIG. 15A, the first object 22 (identified with "A") is labelled by the bellow 90 identified with "1" as a result of the turret 70 rotating to the first application position, as shown in FIG. 15A.

The instructions stored in the memory of the computer 28 includes instruction to hold the turret 70 in the application position, e.g., instruction to not move the turret 70, until a signal is received to move the turret 70, e.g., another occupied signal indicating that an upcoming spot 26 is occupied or the absence of another occupied signal within a threshold time. For example, the computer 28 may refrain from sending an instruction to move the turret 70, or may send an instruction to prevent movement of the turret 70. Accordingly, the turret 70 pauses momentarily as the conveyor 24 continues to move, i.e., the turret 70 tamps and holds. As shown in phantom lines in FIG. 15A, as the conveyor 24 continues to move, the end of the bellow 90 rides on the object 22. This momentary tamp and hold increases the likelihood that the adhesive on the label 18 adheres to the object 22. The threshold time is based on the spacing between the spaces 26 and the speed of the conveyor 24. For example, the threshold time may be between 10-20 ms.

The instructions stored in the memory of the computer 28 include instruction to receive a second occupied signal, i.e., after the tamp and hold, indicating that a second spot 26 on the conveyor 24 is occupied with a second object 22 to be labeled after the first object 22. The instructions stored in the memory of the computer 28 include instruction to the turret motor 94 to rotate the turret 70 continuously, i.e., without slowing at the intermediate position, from the first application position to a second application position based on the second occupied signal to apply a second label 18 to the second object 22. For example, as shown in FIGS. 15A-B, the second object 22 (identified with "B") is labelled by the bellow 90 identified with "2" as a result of the turret 70 rotating to the second application position, e.g., rotating 90 degrees from the position shown in FIG. 15A. The second application position occurs when the bellow 90 identified with "2" is aligned with the pressure port and the second object 22 is below the turret 70.

As set forth above, when the computer 28 receives a signal, e.g., from the conveyor 24, that the next spot 26 on the conveyor 24 is empty (i.e., a signal that the next spot 26 is empty or the absence of a signal indicating that the next spot 26 is occupied), the computer 28 includes instructions to power the turret motor 94 to move the turret 70 to an intermediate position. For example, with continued reference to FIG. 15B, after instructing the turret motor 94 to move to the second application position, the instructions stored in the memory of the computer 28 include instruction to determine the absence of a third occupied signal within a time threshold. For example, this occurs when the spot 26 between the spots 26 identified with "B" and "C" in FIG. 15B is empty. As that empty spot 26 approaches the labelling machine 10, there is an absence of a third occupied signal as the conveyor 24 continues to move. The instructions include instructions to instruct the turret motor 94 to rotate the turret 70 to an intermediate position, e.g., 45 degrees in the example shown in the Figures) and to slow the turret 70 at the intermediate position based on the determination of the absence of the third occupied signal as the conveyor 24 moves beyond a threshold position, e.g., that an unoccupied spot 26 is approaching and or a threshold time has elapsed. As set forth above, the intermediate position is between two consecutive application positions, e.g., between the second application position and the third application position described below.

With reference to FIG. 15C, as the conveyor 24 continues to move, the object 22 in the spot 26 identified with "C" approaches the labelling machine 10, and the conveyor 24 provides a third occupied signal to the computer 28. Specifically, after instructing the turret motor 94 to rotate the turret 70 to the intermediate position, the instructions stored in the computer 28 include receiving the third occupied signal indicating that a third spot 26 (the spot 26 identified with "C") on the conveyor 24 is occupied with a third object 22 to be labeled after the second object 22, and instructing the turret motor 94 to rotate the turret 70 to a third application position (as shown in FIG. 15C) based on the third occupied signal to apply a third label 18 to the third object 22. The third occupied signal may be received by the computer 28 before or after the turret 70 arrives at the intermediate position. In the event that the computer 28 receives the occupied signal before the turret 70 arrives at the intermediate position, the computer 28 may instruct the turret motor 94 to pass by the intermediate position to the next application position, without stopping at the intermediate position. In any event, as shown in FIG. 15C, the third object 22 (identified with "C") is labelled by the bellow 90 identified with "3" as a result of the turret 70 rotating to the third application position, e.g., rotating the turret 70 45 degrees from the intermediate position shown in FIG. 15B). The third application position occurs when the bellow 90 identified with "3" is aligned with the pressure port and the second object 22 is below the turret 70.

The instructions stored in the memory of the computer 28 include providing instruction to the label advancement motor 96 to pull the liner 16 when the turret motor 94 is rotating so that a label 18 is fed to the turret 70. For example, when the computer 28 instructs the turret motor 94 to rotate, the computer 28 may simultaneously instruct the label advancement motor 96 to rotate. The computer 28 may synchronize the speeds of the turret motor 94 and the label advancement motor 96 such that a label 18 reaches the predetermined position at the dispensing end 40 as a bellow 90 is approaching the dispensing end 40.

The instructions stored in the memory of the computer 28 include receiving a stop instruction from the second label sensor 110 indicating that one of the labels 18 has reached a predetermined position prior to being picked up by the turret 70, and stopping the label advancement motor 96 based on the stop instruction. Specifically, as set forth above, the second label sensor 110 senses the label 18 at the dispensing end 40, e.g., the notch 42, to generate the stop instruction. The computer 28 may instruct the label advancement motor 96 to stop after a predetermined time delay after receiving the stop instruction from the second label sensor 110. The predetermined position may be, for example, the position of the label 18 when the leading edge of the label 18 unpeels from the liner 16 at the dispensing end 40. The computer 28 may instruct the label advancement motor 96 to stop after the predetermined time delay to allow the label 18 to further unpeel from the liner 16.

The instructions stored in the memory of the computer 28 may include receiving instruction from the bellow sensor 112 that the turret 70 is in an application position, as described above. The instructions stored in the memory of the computer 28 include confirming that a label 18 has been applied to an object 22 and that a label 18 has been picked up at the dispensing end 40. Specifically, the computer 28 makes this confirmation based on an instruction from the turret sensor 112 that the turret 70 is at, or has passed, the application position, and an instruction from the second label sensor 110 that a label 18 has reached the predetermined position at the dispensing end 40. After the label 18 has reached the predetermined position, the label advancement motor 96 moves the label 18 farther toward the dispensing end 40 to expose the label 18 for pick up by the adjacent bellow 90. Since the bellow 90 draws vacuum, as described above, the computer 28 concludes that the bellow 90 has picked up the label 18 in response to receiving the instruction from both the turret sensor 112 (i.e., that the turret 70 is in position to pick up a label 18) and the second label sensor 110 (i.e., that the label 18 is in proper position to be picked up by the bellow 90).

The instructions include receiving a label signal from the first label sensor 108 detecting the presence of a label 18, and providing an instruction to the printer 92 to print based on the label signal. Specifically, as set forth above, the first label sensor 108 senses the label 18 along the path of the liner 16 upstream of the printer 92, and the first label sensor 108 generates the label signal. The first label sensor 108 may provide the label signal directly to the printer 92, or may provide the label signal to the computer 28, which provides the instruction to the printer 92. Specifically, the instructions stored in the memory of the computer 28 may include instructions to provide a signal to the printer 92 to print after a predetermined time delay after the label advancement motor 96 is moved to advance the liner 16 and labels 18. The delay allows for registration of an upcoming label 18 with the printer 92, and results in the printer 92 printing on the label 18 as the label 18 travels across the printer 92.

The instructions stored in the memory of the computer 28 may include instructions to count the number of labels 108 that pass the first label sensor 108. In particular, the first label sensor 108 may be programmed to count the number of labels 18 that pass the first label sensor 108. As another example, the first label sensor 108 may communicate to the computer 28 each time a label 18 passes the first label sensor 108, and the computer 28 may count the number of labels 18 that pass the first label sensor 108. This feature and instruction may be used to monitor the total number of labels 18 used by the labelling machine 10 to assist in inventory.

Figure 14:
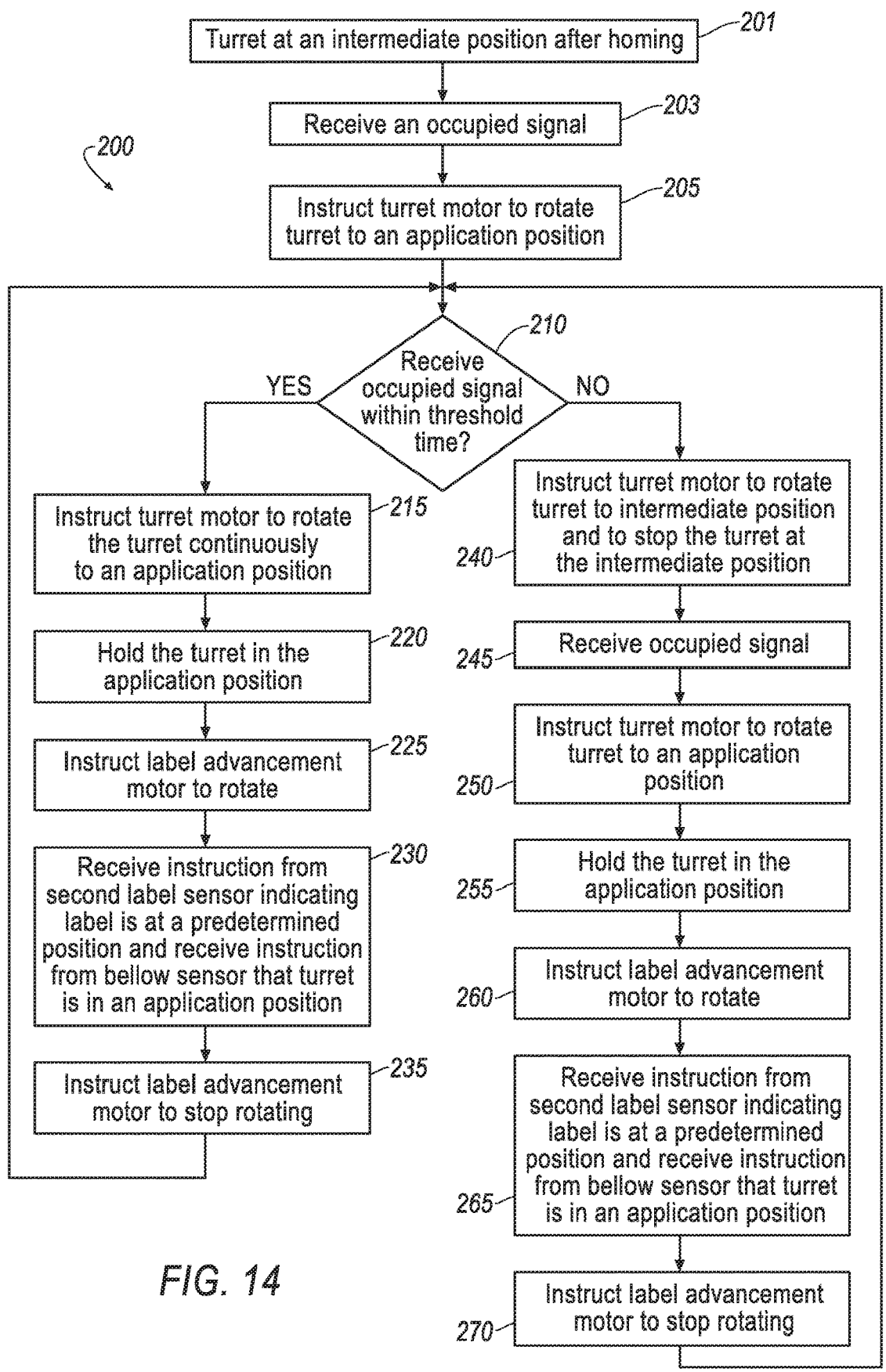
FIG. 14 is a flow chart for a method of labelling.

A labelling method 200 is shown in FIG. 14. With reference to FIG. 14, the method 200 starts by first performing a homing process and moving the turret 70 to an intermediate position, i.e., between two consecutive application positions, as shown in block, as shown in block 201. The method includes receiving an occupied signal, as shown in block 202, and instructing the turret motor 94 to rotate the turret 70 to an application position, as shown in block 205.

The method 200 next includes determining whether an occupied signal is received within the threshold time, as shown in decision block 210. Specifically, the conveyor 24 may send an occupied signal to the computer 28. The occupied signal indicates that an upcoming spot 26 on the conveyor 24 is occupied with an object 22 to be labelled. As set forth above, the threshold time is predetermined depending on the spacing between spots 26 of the conveyor 24 and conveyor speed. If the computer 28 does not receive an instruction from the conveyor 24 within the threshold time, this indicates that the next spot 26 moving below the labelling machine 10 is empty.

If the computer 28 receives the occupied signal within the threshold time, this indicates that the next spot 26 moving below the labelling machine 10 is occupied by an object 22 to be labelled. In this instance, as shown in block 215, the method includes instructing the turret motor 94 to rotate the turret 70 continuously to the next application position. In other words, as set forth above, the turret motor 94 rotates to the turret 70 to the next application position without slowing at the intermediate position.

With the turret 70 in the application position and the conveyor 24 moving the object 22 below the labelling machine 10, the bellow 90 in the application position applies the label 18 to the object 22 below the labelling machine 10. As shown in block 220, the method includes maintaining, i.e., holding, the turret 70 in the application position until an additional instruction is received to rotate the turret motor 94, e.g., another occupied signal indicating that an upcoming spot 26 is occupied or the absence of another occupied signal within the threshold time. The conveyor 24 continues to move during this time. As shown in FIG. 15A, this results in the bellow 90 moving with the object 22 to increase the likelihood of adhering the label 18 to the object 22. As described above, the step of maintaining the turret 70 in the application position until additional instruction is received may include either refraining from sending an instruction to move the turret 70, or sending an affirmative instruction to prevent movement of the turret 70.

As shown in block 225, the method includes instructing the label advancement motor 96 to rotate. Specifically, the computer 28 instructs the label advancement motor 96 to rotate. As set forth above, the computer 28 may provide this instruction to the label advancement motor 96 when the turret motor 94 instructs the computer 28 that the turret motor 94 has moved the turret 70 toward the application position, or specifically, as an example, that the turret 70 has reached the application position.

With reference to block 230, the method next includes receiving an instruction, i.e., a stop instruction, from the second label sensor 110 indicating that a label 18 is at the dispensing end 40, e.g., the notch 42. The computer 28 may receive the stop instruction from the second label sensor 110. With continued reference to block 230, this step also includes receiving instruction from the bellow sensor 112 that the turret 70 is in an application position, as described above.

With continued reference to block 230, the method may include confirming that a label 18 has been applied to an object 22 and that a label 18 has been picked up at the dispensing end 40. Specifically, this confirmation is based on an instruction from the turret sensor 112 that the turret 70 is at, or has passed, the application position, and an instruction from the second label sensor 110 that a label 18 has reached the predetermined position at the dispensing end 40. After the label 18 has reached the predetermined position, the method may include moving the label advancement motor 96 to move the label 18 farther toward the dispensing end 40 to expose the label 18 for pick up by the adjacent bellow 90. Since the bellow 90 draws vacuum, as described above, the computer 28, the computer 28 concludes that the bellow 90 has picked up the label 18 in response to receiving the instruction from both the turret sensor 112 (i.e., that the turret 70 is in position to pick up a label 18) and the second label sensor 110 (i.e., that the label 18 is in proper position to be picked up by the bellow 90).

With reference to block 235, the method next includes instructing the label advancement motor 96 to stop rotating in response to receiving the stop instruction from the second label sensor 110. The method may include instructing the label advancement motor 96 to stop after a predetermined time delay after receiving the stop instruction from the second label sensor 110. As set forth above, the predetermined position may be, for example, the position of the label 18 when the leading edge of the label 18 unpeels from the liner 16 at the dispensing end 40. The method may include instructing the label advancement motor 96 to stop after the predetermined time delay to allow the label 18 to further unpeel from the liner 16.

After block 235, the method is repeated beginning at decision block 210. At decision block 215, the decision is again made whether the next spot 26 is occupied or unoccupied.

With continued reference to FIG. 14, if the computer 28 does not receive the occupied signal within the threshold time, the method includes instructing the turret motor 94 to rotate the turret 70 to an intermediate position, as described above, and to slow the turret 70 at the intermediate position, as shown in block 240. Specifically, the computer 28 instructs the turret motor 94 to rotate the turret 70 to the intermediate position. The turret 70 is shown in the intermediate position in FIG. 15B.

The turret 70 remains in the intermediate position until the computer 28 receives an occupied signal from the conveyor 24 indicating an upcoming spot 26 is occupied. In block 245, the method includes receiving the occupied signal and, as shown in block 250, the method includes instructing the turret motor 94 to rotate the turret 70 to the next application position in response to receiving the occupied signal. Specifically, the computer 28 receives the occupied signal and instructs the turret motor 94 to rotate. With the turret 70 in the application position and the conveyor 24 moving the object 22 below the labelling machine 10, the bellow 90 in the application position applies the label 18 to the object 22 below the labelling machine 10. The turret 70 is shown moved from the intermediate position to the application position in FIG. 15C. As shown in block 255, the method includes maintaining the turret 70 in the application position until an additional instruction is received to rotate the turret motor 94, e.g., another occupied signal indicating that an upcoming spot 26 is occupied or the absence of another occupied signal within the threshold time. As described above, the step of maintaining the turret 70 in the application position until additional instruction is received may include either refraining from sending an instruction to move the turret 70, or sending an affirmative instruction to prevent movement of the turret 70.

As shown in block 260, the method includes instructing the label advancement motor 96 to rotate. Specifically, the computer 28 instructs the label advancement motor 96 to rotate. As set forth above, the computer 28 may provide this instruction to the label advancement motor 96 when the turret motor 94 instructs the computer 28 that the turret motor 94 has moved the turret 70 toward the application position, or specifically, as an example, that the turret 70 has reached the application position. As set forth above, the step of instructing the turret motor 94 to rotate in block 260, and the step of instructing the label advancement motor 96 to rotate in block 260, may be performed at the same time, i.e., the computer 28 may simultaneously provide instructions to the turret motor 94 and the label advancement motor 96. In this instance, the method includes synchronizing the speeds of the turret motor 94 and the label advancement motor 96 such that a label 18 reaches the predetermined position at the dispensing end 40 as a bellow 90 is approaching the dispensing end 40.

With reference to block 265, the method next includes receiving an instruction, i.e., a stop instruction, from the second label sensor 110 indicating that a label 18 is at the dispensing end 40, e.g., the notch 42. The computer 28 may receive the stop instruction from the second label sensor 110. With continued reference to block 265, this step also includes receiving instruction from the bellow sensor 112 that the turret 70 is in an application position, as described above.

With continued reference to block 265, the method may include confirming that a label 18 has been applied to an object 22 and that a label 18 has been picked up at the dispensing end 40. Specifically, the confirming step is based on an instruction from the turret sensor 112 that the turret 70 is at, or has passed, the application position, and an instruction from the second label sensor 110 that a label 18 has reached the predetermined position at the dispensing end 40. After the label 18 has reached the predetermined position, the method may include moving the label advancement motor 96 to move the label 18 farther toward the dispensing end 40 to expose the label 18 for pick up by the adjacent bellow 90. Since the bellow 90 draws vacuum, as described above, the computer 28, the computer 28 concludes that the bellow 90 has picked up the label 18 in response to receiving the instruction from both the turret sensor 112 (i.e., that the turret 70 is in position to pick up a label 18) and the second label sensor 110 (i.e., that the label 18 is in proper position to be picked up by the bellow 90).

With reference to block 270, the method next includes instructing the label advancement motor 96 to stop rotating in response to receiving the stop instruction from the second label sensor 110. The method may include instructing the label advancement motor 96 to stop after a predetermined time delay after receiving the stop instruction from the second label sensor 110. As set forth above, the predetermined position may be, for example, the position of the label 18 when the leading edge of the label 18 unpeels from the liner 16 at the dispensing end 40. The method may include instructing the label advancement motor 96 to stop after the predetermined time delay to allow the label 18 to further unpeel from the liner 16.

After block 270, the method is repeated beginning at decision block 210.

An example of the method of FIG. 14 is described below with reference to FIGS. 15A-C. The method may include receiving a first occupied signal indicating that a first spot 26 on the conveyor 24 is occupied with a first object 22 to be labeled. As shown in FIG. 15A, the method may include instructing the turret motor 94 to rotate the turret 70 to a first application position to apply a first label 18 to the first object 22 in the first spot A.

With reference to FIGS. 15A-B, the method may include receiving a second occupied signal indicating that a second spot 26 on the conveyor 24 is occupied with a second object 22, in spot B, to be labeled after the first object 22. The method may include, after instructing the turret motor 94 to rotate to the first application position, instructing the turret motor 94 to rotate the turret 70 continuously, i.e., without slowing at the intermediate position, from the first application position to a second application position, i.e., 90 degrees, based on the second occupied signal to apply a second label 18 to the second object 22.

With reference to FIG. 15B, after instructing the turret motor 94 to move to the second application position, the method may include determining the absence of a third occupied signal within a time threshold, and instructing the turret motor 94 to rotate the turret 70 to an intermediate position, i.e., 45 degrees, and to slow the turret 70 at the intermediate position based on the determination of the absence of the third occupied signal. In other words, the rotation of the turret 70 may slow to a reduced speed, or may stop, at the intermediate position, before subsequently moving to the next application position after receiving an instruction to do so.

With reference to FIG. 15C, after instructing the turret motor 94 to rotate the turret 70 to the intermediate position, the method may include receiving the third occupied signal indicating that a third spot C on the conveyor 24 is occupied with a third object 22 to be labeled after the second object 22, and instructing the turret motor 94 to rotate the turret 70 to a third application position, i.e., 45 degrees from the position in FIG. 15B, based on the third occupied signal to apply a third label 18 to the third object 22.

The method may include counting the number of labels 108 that pass the first label sensor 108. In particular, as set forth above, the first label sensor 108 may count the number of labels 18 that pass the first label sensor 108. As another example, the first label sensor 108 may communicate to the computer 28 each time a label 18 passes the first label sensor 108, and the computer 28 may count the number of labels 18 that pass the first label sensor 108. This feature and instruction may be used to monitor the total number of labels 18 used by the labelling machine 10 to assist in inventory.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A labelling method comprising:
receiving a first occupied signal indicating that a first spot on a conveyor is occupied with a first object to be labeled;

instructing a turret motor to rotate a turret to a first application position to apply a first label to the first object;

receiving a second occupied signal indicating that a second spot on the conveyor is occupied with a second object to be labeled after the first object;

after instructing the turret motor to rotate to the first application position, instructing the turret motor to rotate the turret continuously from the first application position to a second application position based on the second occupied signal to apply a second label to the second object;

after instructing the turret motor to move to the second application position, determining the absence of a third occupied signal within a time threshold which indicates an unoccupied spot on the conveyor after the second spot, and instructing the turret motor to rotate the turret to an intermediate position and to slow the turret at the intermediate position based on the determination of the absence of the third occupied signal; and after instructing the turret motor to rotate the turret to the intermediate position, receiving the third occupied signal indicating that a third spot on the conveyor which is after the unoccupied spot is occupied with a third object to be labeled after the second object, and instructing the turret motor to rotate the turret to a third application position based on the third occupied signal to apply a third label to the third object, wherein the intermediate position is between the second application position and the third application position.

2. The labelling method of claim 1, wherein instructing the turret motor to rotate the turret to the second application position includes instructing the turret motor to rotate the turret 90 degrees, wherein instructing the turret motor to rotate the turret to the intermediate position includes instructing the turret motor to rotate the turret 45 degrees, and wherein instructing the turret motor to rotate the turret to the third application position includes instructing the turret motor to rotate the turret 45 degrees.

3. The labelling method of claim 1, further comprising providing instruction to a label advancement motor to pull a liner supporting labels when the turret rotates so that one of the labels on the liner is fed to the turret.

4. The labelling method of claim 3, further comprising receiving a stop instruction from a label sensor indicating that one of the labels on the liner has reached a predetermined position prior to being picked up by the turret, and stopping the label advancement motor based on the stop instruction.

5. The labelling method of claim 1, wherein the turret applies vacuum to the label picked up by the turret through holes in communication with the label picked up by the turret before the label picked up by the turret reaches the respective application position.

6. The labelling method of claim 1, wherein the turret stops at the first application position, the second application position, and the third application position.

7. The labelling method of claim 1, wherein the turret stops at the intermediate position.

8. The labelling method of claim 1, further comprising receiving a label signal from a label sensor detecting the presence of one of the labels, and providing an instruction to a printer to print based on the label signal.

9. A computer comprising:
a memory; and
a processor programmed to execute instructions stored in the memory, the instructions including:

receiving a first occupied signal indicating that a first spot on a conveyor is occupied with a first object to be labeled;

instructing a turret motor to rotate a turret to a first application position to apply a first label to the first object;

receiving a second occupied signal indicating that a second spot on the conveyor is occupied with a second object to be labeled after the first object;

after instructing the turret motor to rotate to the first application position, instructing the turret motor to rotate the turret continuously from the first application position to a second application position based on the second occupied signal to apply a second label to the second object;

after instructing the turret motor to move to the second application position, determining the absence of a third occupied signal within a time threshold which indicates an unoccupied spot on the conveyor after the second spot, and instructing the turret motor to rotate the turret to an intermediate position and to slow the turret at the intermediate position based on the determination of the absence of the third occupied signal; and after instructing the turret motor to rotate the turret to the intermediate position, receiving the third occupied signal indicating that a third spot on the conveyor which is after the unoccupied spot is occupied with a third object to be labeled after the second object, and instructing the turret motor to rotate the turret to a third application position based on the third occupied signal to apply a third label to the third object, wherein the intermediate position is between the second application position and the third application position.

10. The computer of claim 9, wherein the instructions include instructing the turret motor to rotate the turret to the second application position includes instructing the turret motor to rotate the turret 90 degrees, wherein instructing the turret motor to rotate the turret to the intermediate position includes instructing the turret motor to rotate the turret 45 degrees, and wherein instructing the turret motor to rotate the turret to the third application position includes instructing the turret motor to rotate the turret 45 degrees.

11. The computer of claim 9, wherein the instructions include providing instruction to a label advancement motor to pull a liner supporting labels when the turret rotates so that one of the labels on the liner is fed to the turret.

12. The computer of claim 11, wherein the instructions include receiving a stop instruction from a label sensor indicating that one of the labels on the liner has reached a predetermined position prior to being picked up by the turret, and stopping the label advancement motor based on the stop instruction.

13. The computer of claim 9, wherein the turret stops at the first application position, the second application position, and the third application position.

14. The computer of claim 9, wherein the turret stops at the intermediate position.

15. The computer of claim 9, wherein the instructions include receiving a label signal from a label sensor detecting the presence of a label, and providing an instruction to the printer to print based on the label signal.

16. A labelling machine comprising:
a base;
a label advancement motor supported by the base;
a printer supported by the base;
a peel plate supported by the base and having a dispensing end;

a first label sensor between the cassette and the printer and configured to sense a label upstream of the printer, the printer being operable based on a signal from the first label sensor;

a second label sensor at the dispensing end and configured to sense a label at the dispensing end; and a computer programmed to control the label advancement motor based on a signal from the second label sensor;

the computer having a memory and a processor programmed to execute instructions stored in the memory, the instructions including:

receiving a first occupied signal indicating that a first spot on a conveyor is occupied with a first object to be labeled;

instructing a turret motor to rotate a turret to a first application position to apply a first label to the first object;

receiving a second occupied signal indicating that a second spot on the conveyor is occupied with a second object to be labeled after the first object;

after instructing the turret motor to rotate to the first application position, instructing the turret motor to rotate the turret continuously from the first application position to a second application position based on the second occupied signal to apply a second label to the second object;

after instructing the turret motor to move to the second application position, determining the absence of a third occupied signal within a time threshold which indicates an unoccupied spot on the conveyor after the second spot, and instructing the turret motor to rotate the turret to an intermediate position and to slow the turret at the intermediate position based on the determination of the absence of the third occupied signal; and after instructing the turret motor to rotate the turret to the intermediate position, receiving the third occupied signal indicating that a third spot on the conveyor which is after the unoccupied spot is occupied with a third object to be labeled after the second object, and instructing the turret motor to rotate the turret to a third application position based on the third occupied signal to apply a third label to the third object, wherein the intermediate position is between the second application position and the third application position.

17. The labelling machine of claim 16 further comprising a cassette supported by the base, the cassette including a panel and a core holder supported by the panel, and the cassette including a brake engaged with the core holder.

18. The labeling machine of claim 16 further comprising a wheel rotatable by the label advancement motor, the wheel including two sets of spikes spaced from each other, each of the sets of spikes extending annularly about the wheel, and a dimpled surface between the two sets of spikes.

19. The labelling machine of claim 18 wherein the brake includes an aluminum plate rotatable relative to the panel by the core holder, the aluminum plate being spaced from the panel, and the brake including a magnet on the panel between the panel and the aluminum plate.

20. The labelling machine of claim 16 further comprising an axle fixed relative to the base, and a turret having an outer hub receiving the axle, and bearings between the axle and the outer hub, the bearings spacing the outer hub from the axle.

* * * * *